United States Patent
Hendriks

(10) Patent No.: US 7,170,681 B2
(45) Date of Patent: Jan. 30, 2007

(54) OPTICAL SCANNING DEVICE

(75) Inventor: Bernardus Hendrikus Wilhelmus Hendriks, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/501,422

(22) PCT Filed: Dec. 18, 2002

(86) PCT No.: PCT/IB02/05624

§ 371 (c)(1),
(2), (4) Date: Jul. 13, 2004

(87) PCT Pub. No.: WO03/060891

PCT Pub. Date: Jul. 24, 2003

(65) Prior Publication Data

US 2005/0083562 A1    Apr. 21, 2005

(30) Foreign Application Priority Data

Jan. 17, 2002 (EP) ................................. 02075210
Jun. 21, 2002 (EP) ................................. 02077463

(51) Int. Cl.
*G02B 27/44* (2006.01)

(52) U.S. Cl. .................. 359/565; 359/494; 359/558; 369/44.37; 369/112.03

(58) Field of Classification Search ............... 359/488, 359/494, 565, 566, 558, 204; 369/44.37, 369/112.01, 112.03, 112.07
See application file for complete search history.

(56) References Cited

U.S. PATENT DOCUMENTS 5,526,338 A    6/1996    Hasman

FOREIGN PATENT DOCUMENTS

JP    2001/209966 A    8/2001
WO    WO 02/21522 A    3/2002

*Primary Examiner*—Fayez G. Assaf
(74) *Attorney, Agent, or Firm*—Michael E. Belk

(57) ABSTRACT

An optical scanning device (1) for scanning three information layer (2, 2', 2") with three respective radiation beams (4, 4', 4") having three respective wavelengths ($\lambda_1, \lambda_2, \lambda_3$) and polarizations (p1, p2, p3). The three wavelengths differ from each other. At least one of the three polarizations differs from the others. The device comprises a diffractive part (24) including a pattern of pattern elements which have one stepped profile for forming three diffracted beams (15, 15', 15") from the three radiation beams, the part comprising birefringent material, sensitive to the three polarizations. The stepped profile is designed such that the heights ($h_j$) of the steps of a pattern element introduce phase changes that equal at least two different multiples of $2\pi$ for one ($\lambda_1$) of the three wavelengths and equal at least two different phase changes modulo $2\pi$ for one ($\lambda_2$) of the two other wavelengths.

Figure 1:
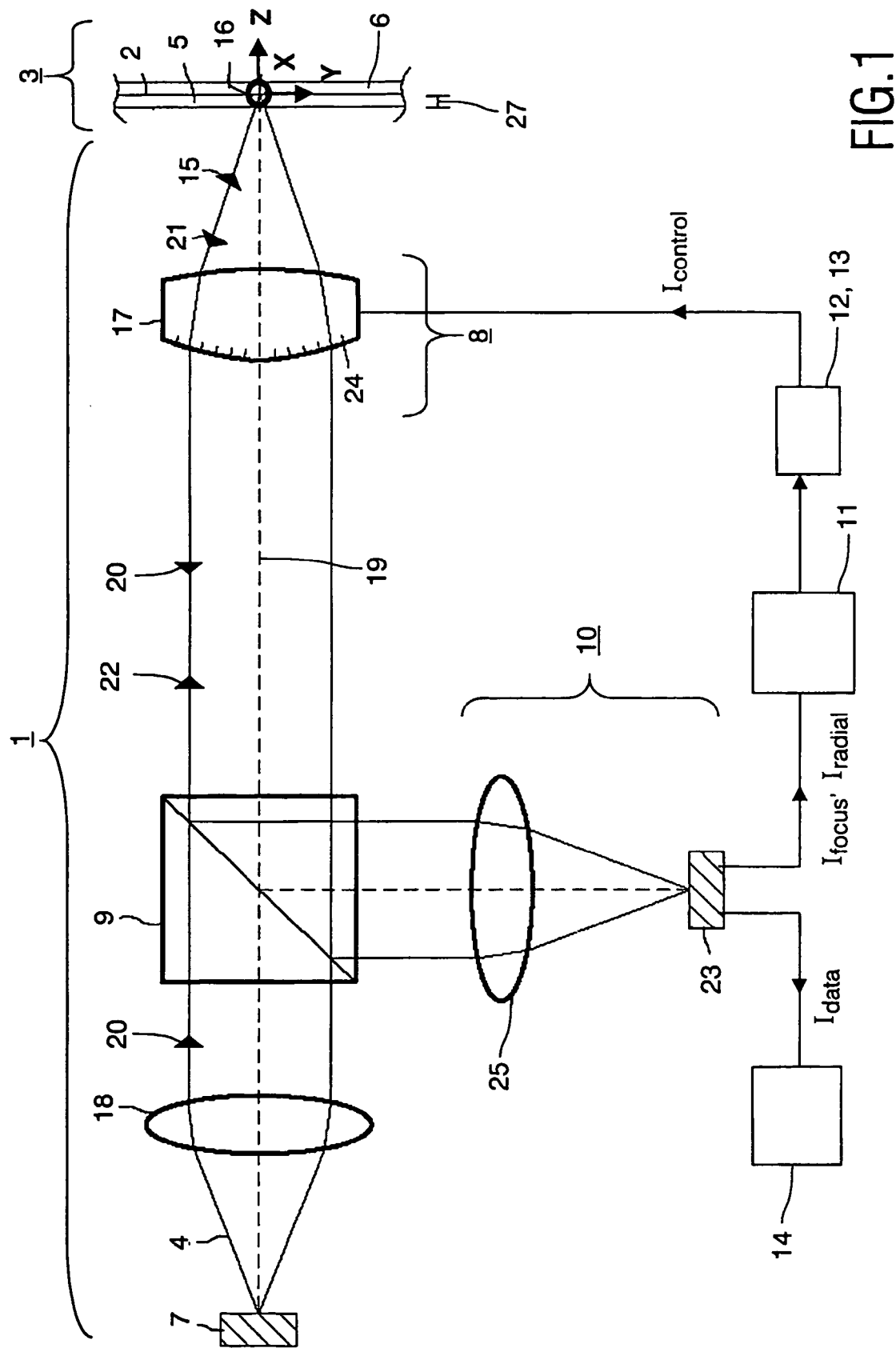

19 Claims, 6 Drawing Sheets first embodiment (first example)

first embodiment (second example)

first embodiment (third example)

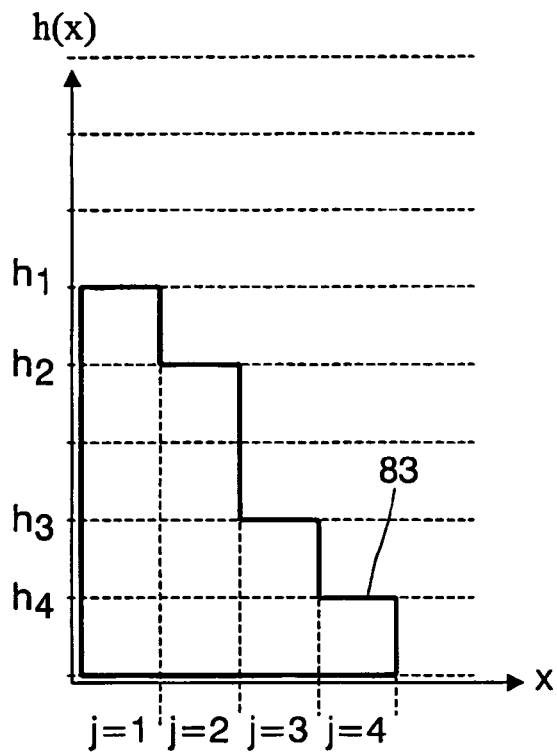
second embodiment (unique example) FIG.9
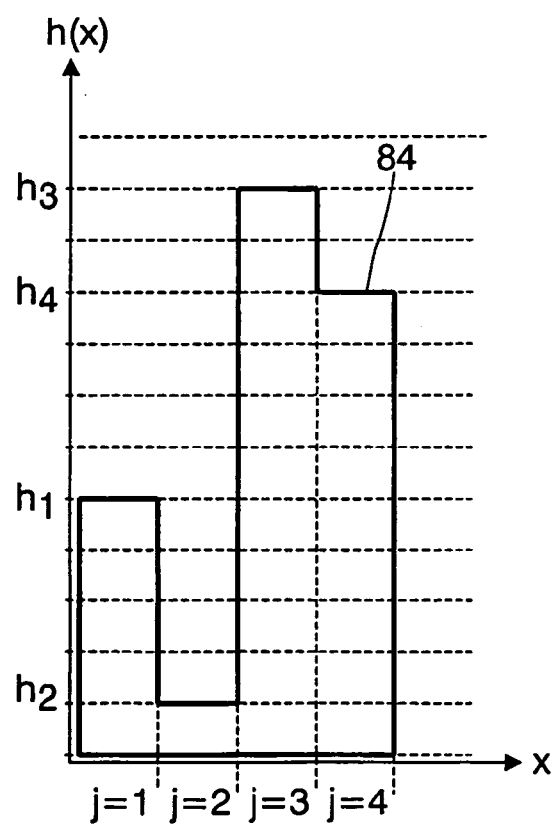
third embodiment (unique example) FIG.10

OPTICAL SCANNING DEVICE

The present invention relates to an optical scanning device for scanning a first information layer by means of a first radiation beam having a first wavelength and a first polarization, a second information layer by means of a second radiation beam having a second wavelength and a second polarization, and a third information layer by means of a third radiation beam having a third wavelength and a third polarization, wherein said first, second and third wavelengths substantially differ from each other and at least one of said first, second and third polarizations differs from the others, the device comprising:

a radiation source for supplying said first, second and third radiation beams consecutively or simultaneously, an objective lens system for converging said first, second and third radiation beams on the positions of said first, second and third information layers, respectively, and a diffractive part arranged in the optical path of said first, second and third radiation beams, the part including a pattern of pattern elements which have substantially one stepped profile for forming a first diffracted radiation beam, a second diffracted radiation beam and a third diffracted radiation beam from said first, second and third radiation beams, respectively, the part comprising birefringent material sensitive to said first, second and third polarizations.

More specifically, but not exclusively, the invention relates to an optical scanning device compatible with three different formats, such as compact discs (CDs), conventional digital versatile discs (DVDs) also called "Red DVD" and so-called next generation DVDs also called "Blue DVD".

The present invention also relates to a diffractive part for use in an optical device for scanning a first information layer by means of a first radiation beam having a first wavelength and a first polarization, a second information layer by means of a second radiation beam having a second wavelength and a second polarization, and a third information layer by means of a third radiation beam having a third wavelength and a third polarization, wherein said first, second and third wavelengths substantially differ from each other and at least one of said first, second and third polarizations differs from the others, the diffractive part:

being arranged in the optical path of said first, second and third radiation beams, including a pattern of pattern elements which have substantially one stepped profile for forming a first diffracted radiation beam, a second diffracted radiation beam and a third diffracted radiation beam from said first, second and third radiation beams, respectively, and comprising birefringent material sensitive to said first, second and third polarizations.

"Scanning an information layer" refers to scanning by means of a radiation beam for reading information in the information layer ("reading mode"), writing information in the information layer ("writing mode"), and/or erasing information in the information layer ("erase mode"). "Information density" refers to the amount of stored information per unit area of the information layer. It is determined by, inter alia, the size of the scanning spot formed by the scanning device on the information layer to be scanned. The information density may be increased by decreasing the size of the scanning spot. Since the size of the spot depends, inter alia, on the wavelength $\lambda$ and the numerical aperture NA of the radiation beam forming the spot, the size of the scanning spot can be decreased by increasing NA and/or by decreasing $\lambda$.

A "diffracted radiation beam" consists of a plurality of radiation beams having each a diffraction order "m", i.e. the zeroth order (m=0), the +1$^{st}$-order (m=1), the +2$^{nd}$-order (m=2), etc., the −1$^{st}$-order (m=−1), the −2$^{nd}$-order (m=−2), etc. It is noted that a radiation beam of the zeroth order is considered, in the present description, as a diffracted radiation beam.

It is desirable for an optical scanning device to be compatible with different formats of optical record carriers, i.e. for scanning optical record carriers of different formats by means of radiation beams having different wavelengths whilst using one objective lens system. For example, CDs are available, inter alia, as CD-A (CD-audio), CD-ROM (CD-read only memory) and CD-R (CD-recordable), and are designed to be scanned by means of a radiation beam having a wavelength ($\lambda$) of about 780 nm. Red-DVDs, on the other hand, are designed to be scanned by means of a radiation beam having a wavelength of about 660 nm, and Blue-DVDs are designed to be scanned by means of a radiation beam having a wavelength of about 405 nm. Notably, a "Blue DVD"-format disc has a greater data storage capacity than a "Red DVD"-format disc—typically at least a twofold increase in storage capacity can be obtained.

The diversity of these formats raises the following difficulties. Firstly, discs designed for being read out at a certain wavelength are not always readable at another wavelength. An example is a "CD-R"-format disc in which special dyes had to be applied in the recording stack in order to obtain a high modulation for $\lambda$=785 nm. At $\lambda$=60 nm, the modulation of the signal from the disc becomes so small due to the wavelength sensitivity of the dye that readout at this wavelength is not feasible. Secondly, when a new optical scanning system with higher storage capacities is introduced, it is important for the new optical scanning device to be backward compatible, i.e. to be able to scan optical record carriers having already existing formats. Thirdly, there is a difference in thickness between two discs having different formats such that spherical aberration is generated in one case and not in the other case.

As a result from this plurality of formats, a problem is to design and to make an optical scanning device capable of generating predefined wavefronts for the wavelength associated to each format.

It has already known, for example, in the Japanese Patent application JP-A-2001209966, to provide an optical scanning device for scanning a "Blue-DVD"-format disc, a "Red-DVD"-format disc and a CD-format disc by means of a first radiation beam, a second radiation beam and a third radiation beam, respectively. The first, second and third radiation beams have a first wavelength $\lambda_1$, a second wavelength $\lambda_2$ and a third wavelength $\lambda_3$, respectively, as well as a first polarization $p_1$, a second polarization $p_2$, and a third polarization $p_3$, respectively. The wavelengths $\lambda_1$, $\lambda_2$ and $\lambda_3$ differ from each other. At least one of the polarizations $p_1$, $p_2$ and $p_3$ differs from the others. Furthermore, the known optical scanning device includes a radiation source for supplying the three radiation beams, an objective lens system for converging the three radiation beams in information layers of the three optical record carriers, respectively, and a diffractive part arranged in the optical path of the three radiation beams. The objective lens system has an optical axis. The diffractive part has two parallel planes between which a first layer made of glass and a second layer are provided. The interface between the first and second layers is a pattern of pattern elements having one stepped profile. The choice of the materials of the first and second layers and the design of the stepped profile are such that the diffractive part forms a first diffracted radiation beam of the zeroth order for the wavelength $\lambda_1$ and a diffracted radiation beam of a higher (i.e. non-zeroth) order for each of the wavelengths $\lambda_2$ and $\lambda_3$. Furthermore, the second layer is made of a birefringent material sensitive to the polarizations $p_1$, $p_2$ and $p_3$.

Said Japanese Patent application JP-A-2001209966 teaches two solutions for making the second layer of the diffractive part.

In the first known solution, the second layer is made of a Liquid Crystal (LC) material that is electrically adjustable (by means of electrodes) for modifying its refractive index so as to form the three diffracted beams. As a result, such a device is complex to design and requires the making of the switchable LC-component which is difficult and expensive to design and to make.

In the second known solution, the second layer is made of a solid birefringent material having an ordinary index and an extraordinary index, one of which equals the refractive index of the first layer (glass). Thus, where the first polarization is aligned with the direction associated with the latter index, the first diffracted beam emerging from the diffractive part has a flat wavefront: the zeroth order of the first diffracted beam is then formed. In other words, the diffractive part then acts as a transparent parallel plate for the first wavelength.

Accordingly, it is an object of the present invention to provide an optical scanning device suitable for scanning optical record carriers by means of radiation beams having three different wavelengths and having different polarizations, the device being an alternative to the known solutions.

This object is reached by an optical scanning device as described in the opening paragraph wherein, according to the invention, said stepped profile is designed such that the heights of the steps of a pattern element introduce phase changes that substantially equal at least two different multiples of $2\pi$ for said first wavelength and at least two substantially different phase changes modulo $2\pi$ for said second wavelength. It will be noted that the values of the two substantially different phase changes in respect of said second wavelength can be chosen among a plurality of at least three values as described below in further detail.

By contrast to the solutions known from said Japanese Patent application JP-A-2001209966, the diffractive part according to the invention forms the zeroth order of the first diffracted beam as follows. Thus, where the first polarization is aligned with the direction of either the ordinary axis or the extraordinary axis, phase changes that substantially equal at least two different multiples of $2\pi$ are introduced in the first diffracted beam, as a result of the design of the heights of the steps of a pattern element of the stepped profile. Accordingly, the zeroth order of the first diffracted beam is formed. In other words, in the diffractive part according to the invention, unequal optical path lengths are introduced in the first diffraction beam in a direction perpendicular to the optical axis of the objective lens (called in the following "radial direction"). It is noted that this diffractive part does not acts as a transparent parallel plate for the first wavelength, since the first diffracted beam does not have a flat wavefront, as opposed to the known diffractive part.

An advantage of the stepped profile according to the invention is to provide a diffractive part that forms said first and second diffracted beams with predetermined values, e.g. high values, of transmission efficiencies for desired orders of these beams. Additionally, the diffractive part may form the second diffractive part with a phase change that approximates the ideal sawtooth-like profile as described below in further detail.

Notably, it is known from the European Patent Application filed on Apr. 9, 2000 under the application number 00203066.6, to provide an optical scanning device with a diffractive part that includes a pattern of pattern elements having a stepped profile designed such that the optical paths pertaining to steps of said pattern element are substantially equal to multiples of said first wavelength. Such a diffractive part is advantageous since it allows the formation of diffracted beams with selected diffraction orders (i.e. orders for which a high transmission efficiency is achieved), which is otherwise difficult due to the plurality of wavelengths. However, the teaching of that Application does not provide sufficient guidance for providing the optical scanning device according to the invention.

Firstly, that European Patent Application does not teach how to design an optical scanning device that is compatible with three different formats of optical record carriers, but only describes a device for scanning optical record carriers of two different formats by means of two radiation beams having two wavelengths.

Secondly, the European Patent Application does not teach an easy method for making a diffractive part with a stepped profile. The fixed values of the three wavelengths are a severe constraint when designing the diffractive part using the method explained in that Application. More specifically, when a radiation beam having a wavelength $\lambda$ traverses a step made of a material having a step height h, a phase change $\Phi$ (with respect to the case where the radiation beam traverses the air along the same distance) is introduced in the diffracted beam emerging form the step. The phase change $\Phi$ is given by the following equation:

$$\Phi = 2\pi \frac{h(n - n_0)}{\lambda} \qquad (0)$$

where "n" is the refractive index of the diffractive part and "$n_0$" is the refractive index of the adjacent medium. It follows from Equation (0) that, when the wavelength $\lambda$ changes, the phase change $\Phi$ changes accordingly. Thus, designing a diffractive part compatible for operating with three wavelengths with a stepped profile would require to design a very complex stepped profile having relatively high steps in order to have high efficiency for each of three wavelengths. This results in a diffractive part that is difficult to make.

Thirdly, that European Patent Application does not teach how to design a polarization-sensitive diffractive part such that the optical scanning device can operate with radiation beams having different polarizations.

It is also known from the Japanese Patent Application JP 2001-174614 to make an optical scanning device comprising a diffractive part made of birefringent material, designed to be polarization-sensitive and wavelength-sensitive so as to form a first, zeroth-order radiation beam having a first wavelength and a first polarization, a second, non-zeroth-order radiation beam having the first wavelength and a second, different polarization, and a third radiation beam having a second, different wavelength and the first or second polarization. However, that Japanese Patent Application does not teach how to design the diffractive part such that the optical scanning device can operate with three different wavelengths.

It is also known from the Japanese Patent Application JP 2001-174614 to make an optical scanning device comprising a diffractive part made of birefringent material, designed to be polarization-sensitive and wavelength-sensitive so as to form a first, zeroth-order radiation beam having a first wavelength and a first polarization, a second, non-zeroth-order radiation beam having the first wavelength and a second, different polarization, and a third radiation beam having a second, different wavelength and the first or second polarization. However, that Japanese Patent Application does not teach how to design the diffractive part such that the optical scanning device can operate with three different wavelengths.

It is also known from the Japanese Patent Application JP 2001-195769 to make an optical scanning device suitable for scanning optical record carriers by means of three radiation beams having three different wavelengths, the device comprising a diffractive part. However, that Japanese Patent Application does not teach how to provide an optical scanning device for scanning optical record carriers by means of radiation beams having different polarizations. In particular, that Japanese Patent Application does not describe or suggest how to make a polarization-sensitive diffractive part and, more specifically, it does not mention the use of birefringent material for making the diffractive part.

Furthermore, it is known from numerous patent documents, e.g. JP-2001043559, to provide an optical scanning device comprising a diffractive part operating with two radiation beams having two different wavelengths. However, none of these documents mention the use of birefringent material to make a polarization-sensitive diffractive part such that the optical scanning device can operate with radiation beams having different polarizations.

In a first embodiment of the optical scanning device according to the present invention, said stepped profile is further designed such that the heights of the steps of a pattern element introduce phase changes that substantially equal at least two substantially different phase changes modulo $2\pi$ for said third wavelength. Similarly to the second wavelength, it is noted that the values of the two substantially different phase changes in respect of said third wavelength can be chosen among a plurality of at least three values. In a particular case of this first embodiment, said stepped profile is further designed such that the heights of the steps of a pattern element introduce substantially identical phase changes for both said second and third wavelengths, wherein said third polarization differs from said second polarization.

In a second embodiment of the optical scanning device according to the present invention, said stepped profile is designed such that the heights of the steps of a pattern element introduce phase changes that substantially equal at least two different multiples of $2\pi$ for said third wavelength. In a particular case of this second embodiment, said stepped profile is further designed such that the heights of the steps of a pattern element introduce substantially identical phase changes for both said first and third wavelengths, wherein said third polarization differs from said first polarization.

In a third embodiment of the optical scanning device according to the present invention, said stepped profile is designed such that the heights of the steps of a pattern element introduce phase changes that substantially equal at least two different odd multiples of $\pi$ for said third wavelength. In a particular case of the third embodiment, said stepped profile is further designed such that the heights of the steps of a pattern element introduce phase changes that substantially equal at least two substantially different phase changes for said second wavelength. It will be noted that these two substantially different phase changes for said second wavelength are chosen among an odd number of substantially different phase changes.

It will be noted that if the first, second and third polarizations are identical, only two different values (zero and $\pi$ modulo $2\pi$) can be chosen for the phase changes in respect of the second or third diffracted beam. Therefore, the stepped profile cannot be designed with predetermined values, e.g. high values, of transmission efficiencies for desired orders of each of the first, second and third diffracted beams. By contrast, it will be noted that if at least one of the first, second and third polarizations differs from the others, at least three different values can be chosen for each of the second and third diffracted beams, thereby resulting in allowing the design of the stepped profile with a relatively low number of steps, typically less than 40 steps, since a stepped profile with a high number of steps (typically, 50 or more steps) is of less practical use.

Another object of the present invention is to provide a diffractive part for use in an optical device for scanning a first information layer by means of a first radiation beam having a first wavelength and a first polarization, a second information layer by means of a second radiation beam having a second wavelength and a second polarization, and a third information layer by means of a third radiation beam having a third wavelength and a third polarization, wherein said first, second and third wavelengths substantially differ from each other and at least one of said first, second and third polarizations differs from the others, the diffractive part being an alternative to the known part.

This object is reached by a diffractive part as described in the opening paragraph wherein, according to the invention, characterized in that said stepped profile is designed such that the heights of the steps of a pattern element introduce phase changes that substantially equal at least two different multiples of $2\pi$ for said first wavelength, at least two substantially different phase changes modulo $2\pi$ for said second wavelength and, for said third wavelength, one of the following: at least two substantially different phase changes modulo $2\pi$, at least two different multiples of $2\pi$, or at least two different odd multiples of $\pi$.

Figure 2:
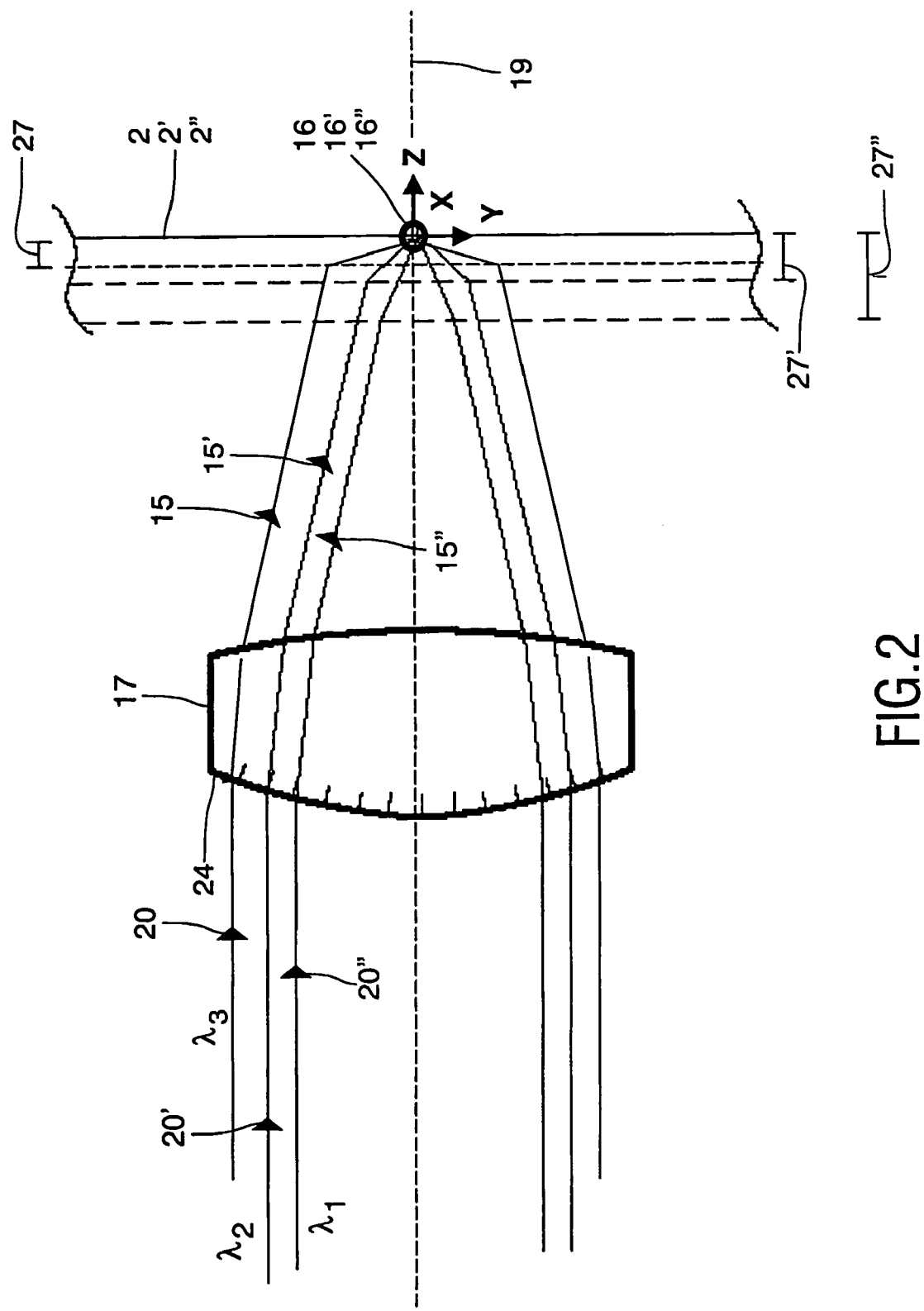
Figure 3:
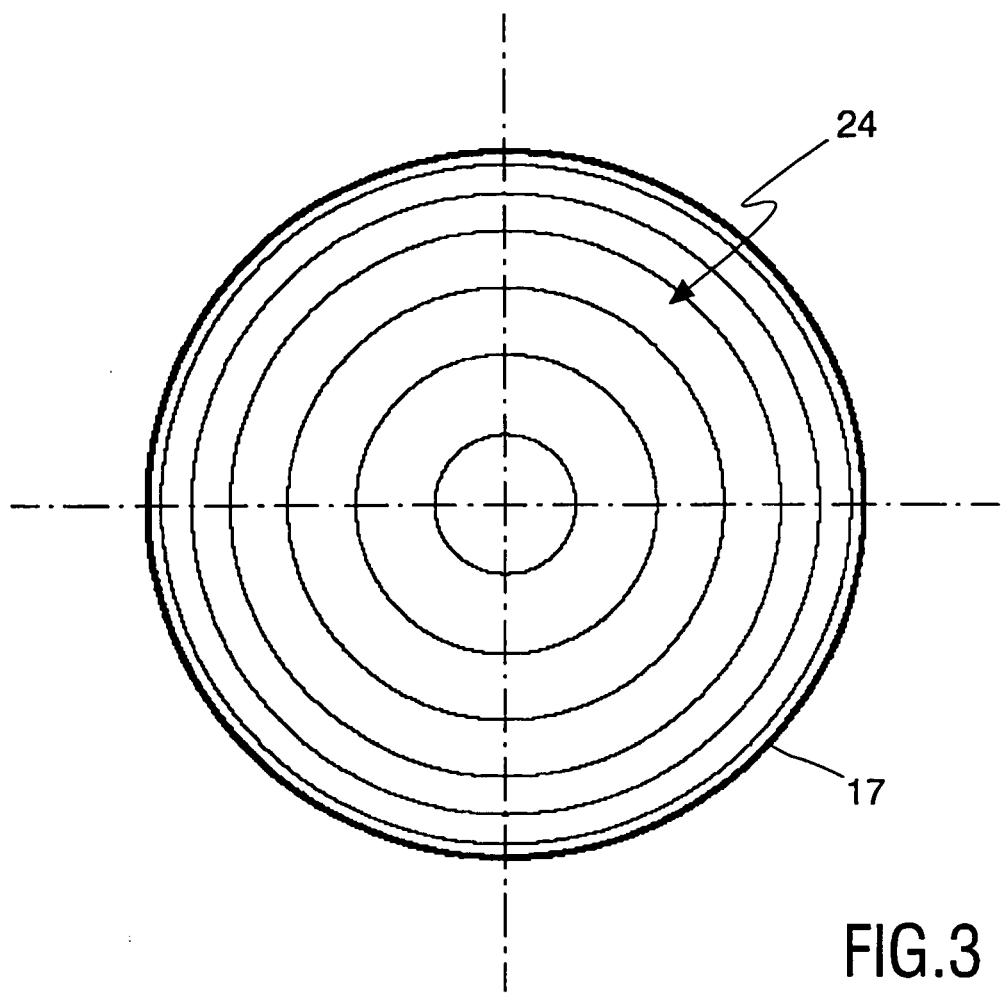
Figure 4:
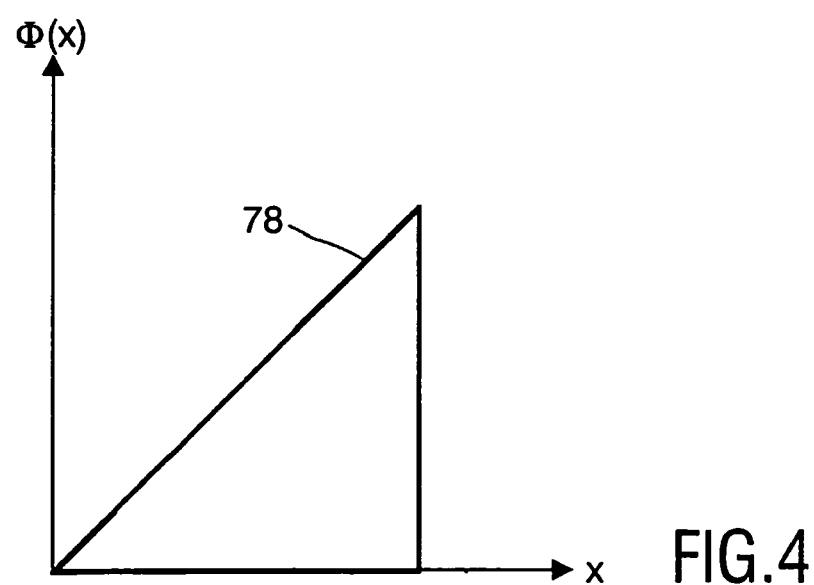
Figure 5:
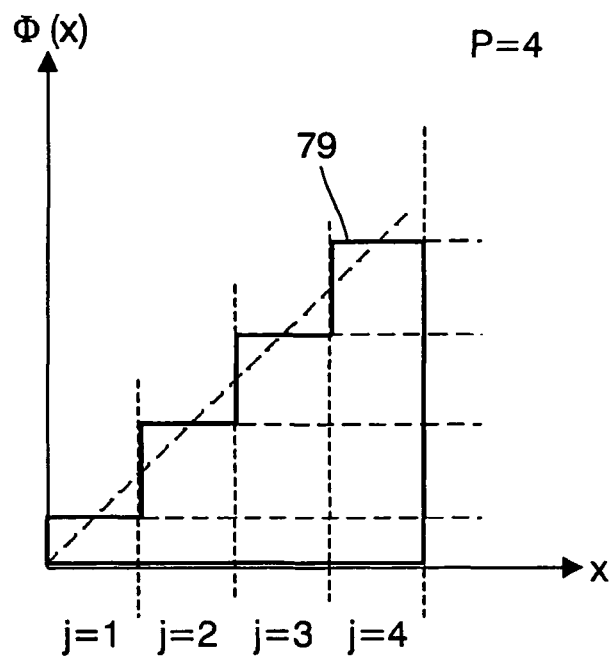
Figure 6:
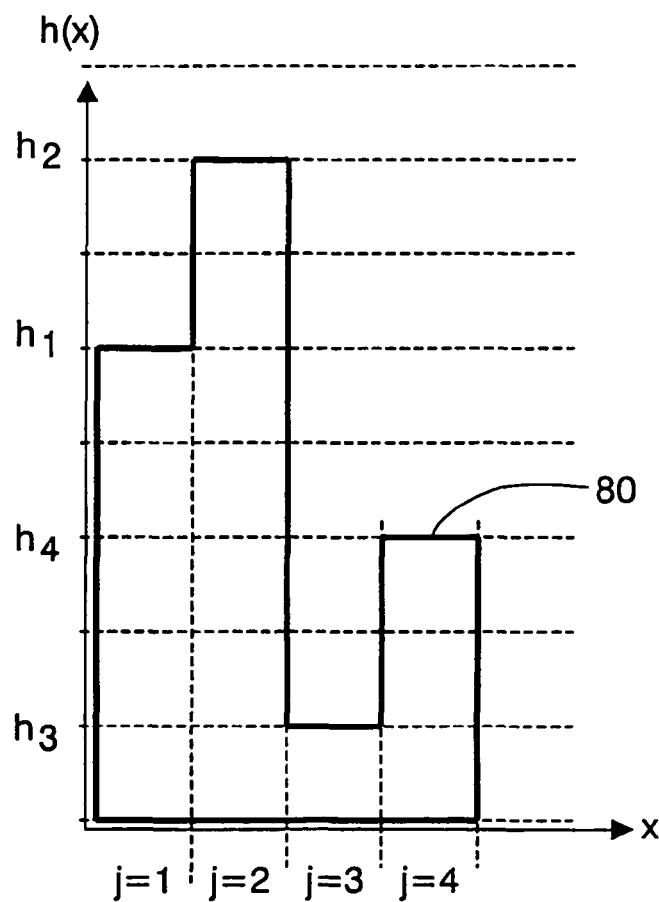
Figure 7:
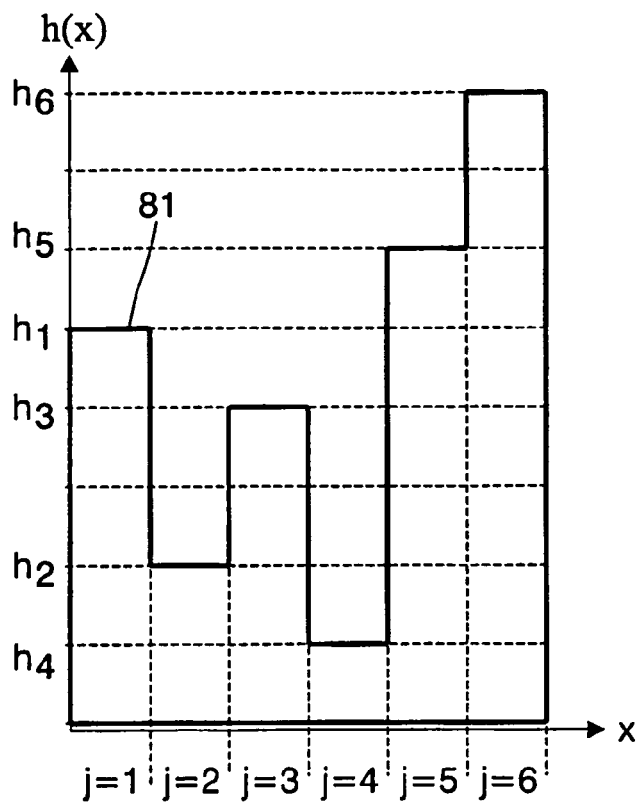
Figure 8:
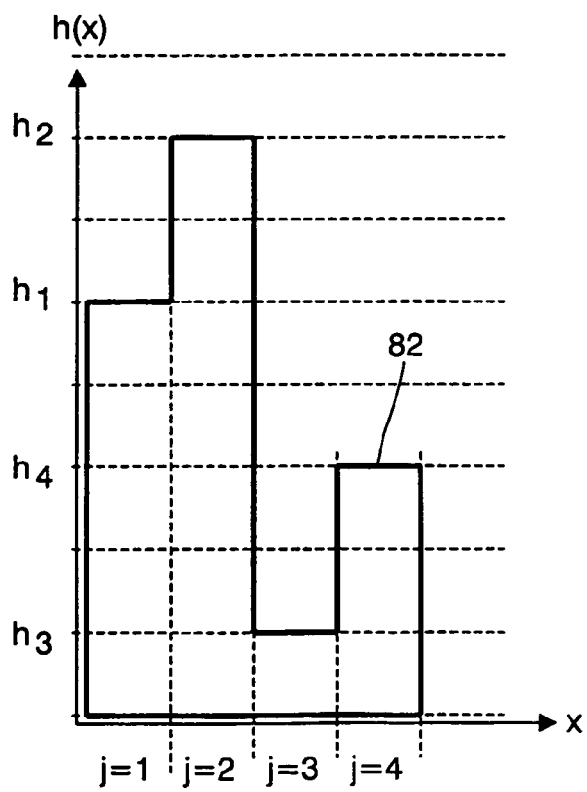

The objects, advantages and features of the invention will be apparent from the following, more detailed description of the invention, as illustrated in the accompanying drawings, in which:

FIG. 1 is a schematic illustration of components of an optical scanning device 1 according to the invention, FIG. 2 is a schematic illustration of an objective lens for use in the scanning device of FIG. 1, FIG. 3 is a schematic front view of the objective lens of FIG. 2, FIG. 4 shows a curve representing a phase change introduced by the diffractive part shown in FIGS. 2 and 3, in the form of a sawtooth-like function (ideal case), FIG. 5 shows a curve representing a phase change introduced by the diffractive part shown in FIGS. 2 and 3, in the form of a stepped function (approximation case), FIG. 6 shows a curve representing the step heights of a first example of a first embodiment of the diffractive part shown in FIGS. 2 and 3, FIG. 7 shows a curve representing the step heights of a second example of a first embodiment of the diffractive part shown in FIGS. 2 and 3, FIG. 8 shows a curve representing the step heights of a third example of a first embodiment of the diffractive part shown in FIGS. 2 and 3, FIG. 9 shows a curve representing the step heights of a second embodiment of the diffractive part shown in FIGS. 2 and 3, and FIG. 10 shows a curve representing the step heights of a third embodiment of the diffractive part shown in FIGS. 2 and 3.

FIG. 1 is a schematic illustration of the optical components of an optical scanning device 1 according to one embodiment of the invention, for scanning a first information layer 2 of a first optical record carrier 3 by means of a first radiation beam 4.

By way of illustration, the optical record carrier 3 includes a transparent layer 5 on one side of which the information layer 2 is arranged. The side of the information layer facing away from the transparent layer 5 is protected from environmental influences by a protective layer 6. The transparent layer 5 acts as a substrate for the optical record carrier 3 by providing mechanical support for the information layer 2. Alternatively, the transparent layer 5 may have the sole function of protecting the information layer 2, while the mechanical support is provided by a layer on the other side of the information layer 2, for instance by the protective layer 6 or by an additional information layer and transparent layer connected to the uppermost information layer. It is noted that the information layer has a first information layer depth 27 that corresponds to, in this embodiment as shown in FIG. 1, to the thickness of the transparent layer 5. The information layer 2 is a surface of the carrier 3. That surface contains at least one track, i.e. a path to be followed by the spot of a focused radiation on which path optically-readable marks are arranged to represent information. The marks may be, e.g., in the form of pits or areas with a reflection coefficient or a direction of magnetization different from the surroundings. In the case where the optical record carrier 3 has the shape of a disc, the following is defined with respect to a given track: the "radial direction" is the direction of a reference axis, the X-axis, between the track and the center of the disc and the "tangential direction" is the direction of another axis, the Y-axis, that is tangential to the track and perpendicular to the X-axis.

As shown in FIG. 1, the optical scanning device 1 includes a radiation source 7, a collimator lens 18, a beam splitter 9, an objective lens system 8 having an optical axis 19, a diffractive part 24, and a detection system 10. Furthermore, the optical scanning device 1 includes a servocircuit 11, a focus actuator 12, a radial actuator 13, and an information processing unit 14 for error correction.

In the following "Z-axis" corresponds to the optical axis 19 of the objective lens system 8. It is noted that (X, Y, Z) is an orthogonal base.

The radiation source 7 is arranged for consecutively or simultaneously supplying the radiation beam 4, a second radiation 4' (not shown in FIG. 1) and a third radiation beam 4" (not shown in FIG. 1). For example, the radiation source 7 may comprise either a tunable semiconductor laser for consecutively supplying the radiation beams 4, 4' and 4" or three semiconductor lasers for simultaneously supplying these radiation beams. Furthermore, the radiation beam 4 has a wavelength $\lambda_1$ and a polarization $p_1$, the radiation beam 4' has a wavelength $\lambda_2$ and a polarization $p_2$, and the radiation beam 4" has a wavelength $\lambda_3$ and a polarization $p_3$. The wavelengths $\lambda_1$, $\lambda_2$ and $\lambda_3$ differ substantially from each other and at least two of the polarizations $p_1$, $p_2$ and $p_3$ differ from each other. Examples of the wavelengths $\lambda_1$, $\lambda_2$ and $\lambda_3$ and the polarizations $p_1$, $p_2$ and $p_3$ will be given below.

The collimator lens 18 is arranged on the optical axis 19 for transforming the radiation beam 4 into a substantially collimated beam 20. Similarly, it transforms the radiation beams 4' and 4" into two respective substantially collimated beams 20' and 20" (not shown in FIG. 1).

The beam splitter 9 is arranged for transmitting the collimated radiation beam 20 toward the objective lens system 8. Preferably, the beam splitter 9 is formed with a plane parallel plate that is tilted with an angle α with respect to the Z-axis and, more preferably, α=45°.

The objective lens system 8 is arranged for transforming the collimated radiation beam 20 to a first focused radiation beam 15 so as to form a first scanning spot 16 in the position of the information layer 2. In this embodiment, the objective lens system 8 includes an objective lens 17 provided with the diffractive part 24.

The diffractive part 24 includes birefringent material having an extraordinary refractive index ne and an ordinary refractive index no. In the following the change in refractive index due to difference in wavelength is neglected and therefore the refractive indices ne and no are approximately independent of the wavelength. In this embodiment, and by way of illustration only, the birefringent material is C6M/E7 50/50 (in % by weight) with $n_o$=1.51 and $n_e$=1.70. Alternatively, for example, the birefringent material may be C6M/C3M/E7 40/10/50 (in % by weight) with $n_o$=1.55 and $n_e$=1.69. The codes used refer to the following substances:

E7: 51% C5H11 cyanobiphenyl, 25% C5H15cyanobiphenyl, 16% C8H17cyanobiphenyl, 8% C5H$_{11}$ cyanotriphenyl;

C3M: 4-(6-acryloyloxypropyloxy) benzoyloxy-2-methylphenyl 4-(6-acryloyloxypropyloxy) benzoate;

C6M: 4-(6-acryloyloxyhexyloxy)benzoyloxy-2-methylphenyl 4-(6-acryloyloxyhexyloxy) benzoate.

The diffractive part 24 is aligned such that the optic axis of the birefringent material is along the Z-axis. It is also aligned such that its refractive index equals $n_e$ when traversed by a radiation beam having a polarization along the X-axis and $n_o$ when traversed by a radiation beam having a polarization along the Y-axis. In the following the polarization of a radiation beam is called "$p_e$" and "$p_o$" where aligned with the X-axis and the Y-axis, respectively. Thus, where the polarization $p_1$, $p_2$ or $p_3$ equals $p_e$, the refractive index of the birefringent material equals $n_e$ and, where the polarization $p_1$, $p_2$ or $p_3$ equals $p_o$, the refractive index of the birefringent material equals $n_o$. In other words, the birefringent diffractive part 24 so aligned is sensitive to the polarizations $p_1$, $p_2$ and $p_3$. The diffractive part 24 will be described in further detail.

During scanning, the record carrier 3 rotates on a spindle (not shown in FIG. 1) and the information layer 2 is then scanned through the transparent layer 5. The focused radiation beam 15 reflects on the information layer 2, thereby forming a reflected beam 21 which returns on the optical path of the forward converging beam 15. The objective lens system 8 transforms the reflected radiation beam 21 to a reflected collimated radiation beam 22. The beam splitter 9 separates the forward radiation beam 20 from the reflected radiation beam 22 by transmitting at least a part of the reflected radiation beam 22 towards the detection system 10.

The detection system 6 includes a convergent lens 25 and a quadrant detector 23 which are arranged for capturing said part of the reflected radiation beam 22 and converting it to one or more electrical signals. One of the signals is an information signal $I_{data}$, the value of which represents the information scanned on the information layer 2. The information signal $I_{data}$ is processed by the information processing unit 14 for error correction. Other signals from the detection system 10 are a focus error signal $I_{focus}$ and a radial tracking error signal $I_{radial}$. The signal $I_{focus}$ represents the axial difference in height along the Z-axis between the scanning spot 16 and the position of the information layer 2. Preferably, this signal is formed by the "astigmatic method" which is known from, inter alia, the book by G. Bouwhuis, J. Braat, A. Huijser et al, entitled "Principles of Optical Disc Systems," pp.75–80 (Adam Hilger 1985) (ISBN 0-85274-785-3). The radial tracking error signal $I_{radial}$ represents the distance in the XY-plane of the information layer 2 between the scanning spot 16 and the center of a track in the information layer 2 to be followed by the scanning spot 16. Preferably, this signal is formed from the "radial push-pull method" which is known from, inter alia, the book by G. Bouwhuis, pp.70–73.

The servocircuit 11 is arranged for, in response to the signals $I_{focus}$ and $I_{radial}$, providing servo control signals $I_{control}$ for controlling the focus actuator 12 and the radial actuator 13, respectively. The focus actuator 12 controls the position of the objective lens 17 along the Z-axis, thereby controlling the position of the scanning spot 16 such that it coincides substantially with the plane of the information layer 2. The radial actuator 13 controls the position of the objective lens 17 along the X-axis, thereby controlling the radial position of the scanning spot 16 such that it coincides substantially with the center line of the track to be followed in the information layer 2.

FIG. 2 is a schematic illustration of the objective lens 17 for use in the scanning device 1 described above.

The objective lens 17 is arranged for transforming the collimated radiation beam 20 to the focused radiation beam 15, having a first numerical aperture $NA_1$, so as to form the scanning spot 16. In other words, the optical scanning device 1 is capable of scanning the first information layer 2 by means of the radiation beam 15 having the wavelength $\lambda_1$, the polarization $p_1$ and the numerical aperture $NA_1$.

Furthermore, the optical scanning device 1 is also capable of scanning a second information layer 2' of a second optical record carrier 3' by means of the radiation beam 4' and a third information layer 2" of a third optical record carrier 3" by means of the radiation beam 4". Thus, the objective lens 17 transforms the collimated radiation beam 20' to a second focused radiation beam 15', having a second numerical aperture $NA_2$, so as to form a second scanning spot 16' in the position of the information layer 2'. The objective lens 17 also transforms the collimated radiation beam 20" to a third focused radiation beam 15", having a third numerical aperture $NA_3$, so as to form a third scanning spot 16" in the position of the information layer 2".

Similarly to the optical record carrier 3, the optical record carrier 3' includes a second transparent layer 5' on one side of which the information layer 2' is arranged with a second information layer depth 27', and the optical record carrier 3" includes a third transparent layer 5" on one side of which the information layer 2" is arranged with a third information layer depth 27". In this embodiment, the optical record carriers 3, 3' and 3" are, by way of example only, a "Blue-DVD"-format disc, a "Red-DVD"-format disc and a CD-format disc, respectively. Thus, the wavelength $\lambda_1$ is comprised in the range between 365 and 445 nm and, preferably, 405 nm. The numerical aperture $NA_1$ equals about 0.6 in the reading mode and is above 0.6, preferably 0.65, in the writing mode. The wavelength $\lambda_2$ is comprised in the range between 620 and 700 nm and, preferably, 660 nm. The numerical aperture $NA_2$ equals about 0.6 in the reading mode and is above 0.6, preferably 0.65, in the writing mode. The wavelength $\lambda_3$ is comprised in the range between 740 and 820 nm and, preferably, 785 nm. The numerical aperture $NA_3$ is below 0.5, preferably 0.45.

It is noted in the present description that two wavelengths $\lambda_a$ and $\lambda_b$ are substantially different from each other where $|\lambda_a-\lambda_b|$ is equal to or higher than, preferably, 20 nm and, more preferably, 50 nm, where the values 20 and 50 nm are a matter of a purely arbitrary choice.

It is also noted that scanning information layers of the record carriers 3, 3' and 3" of different formats is achieved by forming the objective lens 17 as a hybrid lens, i.e. a lens combining diffractive and refractive elements, used in an infinite-conjugate mode. Such a hybrid lens can be formed by applying a grating profile on the entrance surface of the lens 17, for example by a lithographic process using the photopolymerization of, e.g., an UV curing lacquer, thereby advantageously resulting in the diffractive part 24 to be easy to make. Alternatively, such a hybrid lens can be made by diamond turning.

In this embodiment shown in FIGS. 1 and 2, the objective lens 17 is formed as a convex-convex lens; however, other lens element types such as plano-convex or convex-concave lenses can be used. In this embodiment, the diffractive part 24 is arranged on the side of a first objective lens 17 facing the radiation source 7 (referred to herein as the "entrance face").

Alternatively, the diffractive part 24 is arranged on the other surface of the lens 17 (referred to herein as the "exit face"). Also alternatively, the objective lens 10 is, for example, a refractive objective lens element provided with a planar lens diffractive element forming the diffractive part 24. Also alternatively, the diffractive part 24 is provided on an optical element separate from the objective lens system 8, for example on a beam splitter or a quarter wavelength plate.

Also alternatively, whilst the objective lens 10 is in this embodiment a single lens, it may be a compound lens containing two or more lens element. For instance, the objective lens system 8 may include an additional objective lens that forms a doublet-lens system in cooperation with the objective lens 17. The additional objective lens may be plano-convex with a convex surface facing the objective lens 17 and a flat surface facing the position of the information layer 2. This doublet-lens system has advantageously a larger tolerance in mutual position of the optical elements than the single-lens system. In the case where NA>0.45, the additional objective lens is preferably formed by an aspherical lens.

FIG. 3 is a schematic view of the entrance surface (also called "front view") of the objective lens 17 shown in FIG. 2, illustrating the diffractive part 24.

The diffractive part 24 includes a pattern of pattern elements also called "zones". Each zone has a stepped profile. The stepped profiles of the zones are substantially identical. That stepped profile includes a plurality of "subzones" or "steps" having each a step height. In the following the stepped profile is designed for introducing a predetermined phase change $\Phi$ which approximates a sawtooth-like function. FIG. 4 shows a curve 78 representing the phase change $\Phi$ in the form of a sawtooth-like function (which is the ideal case). It is noted that FIG. 4 shows only the phase change $\Phi$ introduced by one pattern element of the diffractive part 24, where the phase change $\Phi$ is a linear function of "x", the coordinate along the X-axis (in the radial direction). It is known, e.g. from said European Patent application filed under the application number 00203066.6, that the sawtooth-like function of the phase change $\Phi$ may be approximated by the following stepped function:

$$\Phi(x) = 2\pi \frac{2j-1}{2P} \text{ for } \frac{j-1}{P} \le x \le \frac{j}{P} \quad (1)$$

where "P" is an integer representing the number of steps or "subzones", "j" is an integer comprised between 1 and P which represents the step number of each step.

FIG. 5 shows a curve 79 representing the phase change Φ introduced by the diffractive part 24 in the approximation form of a stepped function. It is noted that FIG. 5 shows only the phase change Φ introduced by one pattern element of the diffractive part 24.

In the following "h" is the step height of a step of the stepped profile, which is a function dependent on x. In the case of the approximation of the phase change Φ according to Equation (1), the step height h is given by the following function:

$$h(x) = h_j \text{ for } \frac{j-1}{P} \le x \le \frac{j}{P} \quad (2a)$$

where "$h_j$" is the step height of the step j, which is a constant parameter.

When designing the stepped profile of the diffractive part 24, the step height $h_j$ are chosen so that the stepped profile introduces predetermined values of the phase change Φ depending on the wavelength λ and the polarization p of the diffracted beam emerging from the diffractive part 24. Thus, in the following the phase change Φ is also noted Φ(λ,p) and the step height $h_j$ are chosen so that the stepped profile introduces a first value Φ(λ=$λ_1$,p=$p_1$) for the diffracted beam 15, a second value Φ(λ=$λ_2$,p=$p_2$) for the diffracted beam 15', and a third value Φ(λ=$λ_3$,p=$p_3$) for the diffracted beam 15".

In the following and with reference to said European Patent application filed under the application number 00203066.6, the wavelength $λ_1$ is chosen to be the design wavelength $λ_{ref}$. In other words, $$λ_{ref} = λ_1 \quad (2b)$$

Accordingly, the stepped profile is designed such that the phase change Φ(λ=$λ_1$,p=$p_1$) for the radiation beam 15 substantially equals a multiple of 2λ, i.e. substantially equal zero modulo 2π. Thus, Φ(λ=$λ_1$,p=$p_1$)≡0 (2π).

This is achieved when each step height $h_j$ is a multiple of a reference height $h_{ref}$ which is dependent on the design wavelength $λ_{ref}$ as follows:

$$h_{ref}(λ_{ref}) = \frac{λ_{ref}}{n - n_0} \quad (3)$$

where "n" is the refractive index of the diffractive part 24 and $n_0$ is the refractive index of the adjacent medium that is, in the following and by way of illustration only, air, i.e. $n_0$=1.

Since the diffractive part 24 is made of birefringent material, its refractive index n equals $n_e$ when the polarization of the radiation beam traversing the diffractive part 24 equals $p_e$ and equals $n_o$ when the polarization of the radiation beam traversing the diffractive part 24 equals $p_o$. Consequently, the reference height $h_{ref}$ is also dependent on the polarization p. Thus, in the following the phase change $h_{ref}$ is also noted $h_{ref}(λ,p)$ and it follows from Equations (2b) and (3) that:

$$h_{ref}(λ = λ_1, p_1 = p_e) = \frac{λ_1}{n_e - n_0} \quad (4a)$$

$$h_{ref}(λ = λ_1, p_1 = p_o) = \frac{λ_1}{n_o - n_0} \quad (4b)$$

Accordingly, in the case where, e.g., $n_o$=1.50, $n_e$=1.60 and $λ_1$=405 nm, the following is obtained from Equations (4a) and (4b):

$h_{ref}(λ=λ_1,p_1=p_o)$=0.810 μm and $h_{ref}(λ=λ_1,p_1=p_e)$=0.675 μm.

It is also noted that, while a step height $h_j$ introduces the value Φ(λ=$λ_1$,p=$p_1$) (substantially equal to zero modulo 2π) for the radiation beam 15, it introduces the values Φ(λ=$λ_2$, p=$p_2$) and Φ(λ=$λ_3$,p=$p_3$) for the radiation beams 15' and 15", respectively, as follows:

$$\Phi(\lambda = \lambda_2, p_2 = p_e) = 2\pi \frac{n_e - n_0}{\lambda_2} h_{ref}(\lambda_{ref} = \lambda_1, p = p_1) \quad (5a)$$

$$\Phi(\lambda = \lambda_2, p_2 = p_o) = 2\pi \frac{n_o - n_0}{\lambda_2} h_{ref}(\lambda_{ref} = \lambda_1, p = p_1) \quad (5b)$$

$$\Phi(\lambda = \lambda_3, p_3 = p_e) = 2\pi \frac{n_e - n_0}{\lambda_3} h_{ref}(\lambda_{ref} = \lambda_1, p = p_1) \quad (5c)$$

$$\Phi(\lambda = \lambda_3, p_3 = p_o) = 2\pi \frac{n_o - n_0}{\lambda_3} h_{ref}(\lambda_{ref} = \lambda_1, p = p_1) \quad (5d)$$

Table I shows the ideal values Φ(λ=$λ_2$,p=$p_2$) and Φ(λ=$λ_3$, p=$p_3$) where the radiation beams 15' and 15" traverse the step height $h_j$ which equals either $h_{ref}(λ_{ref}=λ_1,p_1=p_e)$ or $h_{ref}(λ_{ref}=λ_1,p_1=p_o)$, in the cases where the polarizations $p_2$ and $p_3$ equal $p_e$ and/or $p_o$. The values Φ(λ=$λ_2$,p=$p_2$) and Φ(λ=$λ_3$,p=$p_3$) have been calculated from Equations (4a), (4b) and (5a) to (5d) with, e.g., $n_o$=1.50, $n_e$=1.60, $λ_1$=405 nm, $λ_2$=650 nm and $λ_3$=785 nm.

TABLE I

| | Φ(λ = $λ_2$, p = $p_2$)/2π (modulo 1) | | Φ(λ = $λ_3$, p = $p_3$)/2π (modulo 1) | |
| --- | --- | --- | --- | --- |
| | $p_2 = p_e$ | $p_2 = p_o$ | $p_3 = p_e$ | $p_3 = p_o$ |
| $h_j = h_{ref}(λ_{ref} = λ_1, p = p_1)$  $p_1 = p_e$ | 0.623 | 0.519 | 0.516 | 0.430 |
| $p_1 = p_o$ | 0.748 | 0.623 | 0.619 | 0.516 |

It is further noted that a step height $h_j$ equal to a multiple of $h_{ref}(λ=λ_1,p=p_1)$ introduces the value Φ(λ=$λ_1$,p=$p_1$) that equals zero modulo 2π for the diffracted beam 15 and the values Φ(λ=$λ_2$,p=$p_2$) and Φ(λ=$λ_3$,p=$p_3$) that each equal one among a limited number of possible values. In the following "#Φ(λ=$λ_2$,p=$p_2$)" and "#Φ(λ=$λ_3$,p=$p_3$)" are such limited numbers for the values Φ(λ=$λ_2$,p=$p_2$) and Φ(λ=$λ_3$,p=$p_3$), respectively. The limited numbers #Φ(λ=$λ_2$,p=$p_2$) and #Φ(λ=$λ_3$,p=$p_3$) have been calculated based on the theory of Continued Fractions, as known from, e.g., the European patent application filed on May 4, 2001 under the application number 01201255.5.

By way of illustration only, the calculation of the limited numbers $\#\Phi(\lambda=\lambda_3,p=p_3)$ is now described in a first case where the polarizations $p_1$ and $p_3$ are identical, e.g. $p_1=p_e$ and $p_3=p_e$, and a second case where the polarization $p_1$ differs from the polarization $p_3$, e.g. $p_1=p_e$ and $p_3=p_o$. With reference to said European patent application filed under the application number 01201255.5, the following is defined:

$$a_0 = \frac{H_1}{H_i} \quad (6a)$$

$$b_0 = Int[a_o] \quad (6b)$$

$$a_1 = a_0 - b_0 \quad (6c)$$

$$b_m = Int\left[\frac{1}{a_m}\right] \quad (6d)$$

$$a_{m+1} = \frac{1}{a_m} - b_m \quad (6e)$$

$$CF_m \equiv \{b_0, b_1 \ldots b_m\} \quad (6f)$$

where $H_1=h_{ref}(\lambda=\lambda_1,p=p_1)$, $H_i=h_{ref}(\lambda=\lambda_3,p=p_3)$ and "m" is an integer equal to or higher than 1.

In the first case where $p_1=p_e$ and $p_3=p_e$ and where, e.g., $n_o=1.50$, $n_e=1.60$, $\lambda_1=405$ nm and $\lambda_3=785$ nm, the following is obtained from Equations (6a) to (6e):

$$H_1 = h_{ref}(\lambda = \lambda_1, p = p_e) = \frac{\lambda_1}{n_e - n_0} = 0.675 \ \mu m$$

$$H_i = h_{ref}(\lambda = \lambda_3, p = p_e) = \frac{\lambda_3}{n_e - n_0} = 1.308 \ \mu m$$

$$a_0 = 0.516$$

$$b_0 = 0$$

$$a_1 = 0.516$$

$$b_1 = 1$$

$$a_2 = 0.937$$

$$b_2 = 1$$

$$CF_2 = 0 + \frac{1}{1 + \frac{1}{1}} = \frac{1}{2}$$

Thus, $CF_2$ substantially equals $a_0$, i.e. the following is met:

$$|CF_2-a_0|=0.016<0.02$$

where 0.02 is a value chosen purely arbitrarily. As a result, it is found that the limited number $\#\Phi(\lambda=\lambda_3,p=p_3)$ is equal to 2.

In the second case where $p_1=p_e$ and $p_3=p_o$, and where, e.g., $n_o=1.50$, $n_e=1.60$, $\lambda_1=405$ nm and $\lambda_3=785$ nm, the following is obtained from Equations (6a) to (6e):

$$H_1 = h_{ref}(\lambda = \lambda_1, p = p_e) = \frac{\lambda_1}{n_e - n_0} = 0.675 \ \mu m$$

$$H_i = h_{ref}(\lambda = \lambda_3, p = p_o) = \frac{\lambda_3}{n_o - n_0} = 1.570 \ \mu m$$

$$a_0 = 0.430$$

-continued $$b_0 = 0$$

$$a_1 = 0.430$$

$$b_1 = 2$$

$$a_2 = 0.326$$

$$b_2 = 3$$

$$CF_2 = 0 + \frac{1}{2 + \frac{1}{3}} = \frac{3}{7}$$

Thus, $CF_2$ substantially equals $a_0$, i.e. the following is met:

$$|CF_2-a_0|=0.001<0.02.$$

As a result, it is found that the limited number $\#\Phi(\lambda=\lambda_3, p=p_3)$ is equal to 7.

Table II shows the limited numbers $\#\Phi(\lambda=\lambda_2,p=p_2)$ and $\#\Phi(\lambda=\lambda_3,p=p_3)$ in respect of a step height $h_j$ equal to $h_{ref}(\lambda=\lambda_1,p=p_e)$ and $h_{ref}(\lambda=\lambda_1,p=p_o)$ and in the cases where the polarizations $p_2$ and $p_3$ equal $p_e$ and/or $p_o$. These limited numbers have been calculated on the theory of Continued Fractions as described above.

TABLE II

| | | $\#\Phi(\lambda = \lambda_2, p = p_2)$ | | $\#\Phi(\lambda = \lambda_3, p = p_3)$ | |
|---|---|---|---|---|---|
| | | $p_2 = p_e$ | $p_2 = p_o$ | $p_3 = p_e$ | $p_3 = p_o$ |
| $h_j = h_{ref}(\lambda = \lambda_1, p = p_1)$ | $p_1 = p_e$ | 8 | 2 | 2 | 7 |
| | $p_1 = p_o$ | 4 | 8 | 3 | 2 |

It is noted in Tables I and II that if the polarizations $p_1$, $p_2$ and $p_3$ are identical, one of the limited numbers $\#\Phi(\lambda=\lambda_2, p=p_2)$ and $\#\Phi(\lambda=\lambda_3,p=p_3)$ equals 2, i.e. only two different values (zero and $\pi$ modulo $2\pi$) can be chosen for the corresponding phase changes. This does not allow to design an efficient diffractive part for a non-zeroth order of the corresponding diffracted beam.

By contrast, it is also noted in Tables I and II that if at least one of the polarizations $p_1$, $p_2$, $p_3$ differs from the others, at least three different values can be chosen for $\Phi(\lambda=\lambda_2,p=p_2)$ and/or $\Phi(\lambda=\lambda_3,p=p_3)$. The possibility for choosing the phase changes from at least 3 possible values allows to make an efficient diffractive part for each of the radiation beams 15, 15' and 15". Furthermore, this advantageously allows to design the stepped profile with a relatively low number of steps, typically less than 40 steps, since a stepped profile with a high number of steps (typically, 50 or more steps) is of less practical use.

Furthermore, the values of the phase changes $\Phi(\lambda=\lambda_1, p=p_1)$, $\Phi(\lambda=\lambda_2,p=p_2)$ and $\Phi(\lambda=\lambda_3,p=p_3)$ are chosen such that the diffractive part 24 has a predetermined transmission efficiency $eff_m$ for each diffraction order m of each of the diffracted radiation beams 15, 15' and 15". It is known, e.g., from said Japanese Patent application JP-A-2001209966 that the transmission efficiency "$eff_m$" of the diffractive part 24 for a diffraction order m is given as follows:

$$eff_m = \left| \frac{1}{T} \int_0^T A(x) \exp\{i\Phi(x)\} \exp\left(-i\frac{2\pi mx}{T}\right) dx \right|^2 \quad (7)$$

wherein "A(x)" is the transparency amplitude distribution and "T" is the grating pitch of the diffractive part 24. In the case of a stepped profile given by Equation (1), Equation (7) can be simplified for the first order (m=1):

$$eff_1 = \left(\frac{P\sin(\pi/P)}{\pi}\right)^2 \quad (8)$$

It is noted from Equation (8) that the higher the number P is chosen, the higher the efficiency $eff_1$ is achieved. However, it is also noted that it may be desirable to use the lowest possible number of steps in each zone in order to achieve greater manufacturing efficiency for the objective lens 17.

In the following, and by way of illustration only, it is described how to choose the step heights $h_j$ of the stepped profile so as to form each of the diffracted radiation beams 15, 15' and 15" with one main diffraction order. In the following "$m_1$", "$m_2$" and "$m_3$" are the main diffraction orders for the diffracted radiation beams 15, 15' and 15", respectively.

Three embodiments of the stepped profile are now described.

The first embodiment of the stepped profile is designed such that $m_1=0$, $m_2=1$ and $m_3=1$. Accordingly, the value $\Phi(\lambda=\lambda_1,p=p_1)$ substantially equals zero modulo $2\pi$ and both the values $\Phi(\lambda=\lambda_2,p=p_2)$ and $\Phi(\lambda=\lambda_3,p=p_3)$ are chosen each among at least three different possible values of phase changes. It is noted that the three different possible values for $\Phi(\lambda=\lambda_2,p=p_2)$ may differ from those for $\Phi(\lambda=\lambda_3,p=p_3)$.

By way of illustration only, in the case where $p_1=p_o$, $p_2=p_o$ and $p_3=p_e$, it is known from Table II that $\#\Phi(\lambda=\lambda_2, p=p_2)=8$ for $p_2=p_o$ and $\#\Phi(\lambda=\lambda_3, p=p_3)=3$ for $p_3=p_e$.

Table III shows the values $\Phi(\lambda=\lambda_2,p=p_2)$ and $\Phi(\lambda=\lambda_3, p=p_3)$ introduced by step heights that equal $qh_{ref}(\lambda=\lambda_1,p=p_1)$ where $p_1=p_o$ and "q" is an integer. These values are found from Table I where the values $\Phi(\lambda=\lambda_2,p=p_2)$ and $\Phi(\lambda=\lambda_3, p=p_3)$ are known a step height that equals $h_{ref}(\lambda=\lambda_1,p=p_1)$ where $p_1=p_o$, i.e. for q=1.

TABLE III

| q | $\Phi(\lambda = \lambda_2, p = p_2)/2\pi$ mod 1<br>$p_2 = p_o$ | $\Phi(\lambda = \lambda_3, p = p_3)/2\pi$ mod 1<br>$p_3 = p_e$ |
|---|---|---|
| 1 | 0.623 | 0.619 |
| 2 | 0.246 | 0.238 |
| 3 | 0.869 | 0.857 |
| 4 | 0.492 | 0.476 |
| 5 | 0.115 | 0.095 |
| 6 | 0.738 | 0.714 |
| 7 | 0.361 | 0.333 |
| 8 | 0.984 | 0.952 |

By way of illustration only, two examples of the first embodiment of the stepped profile are now described where, in the first example, P=4 and, in the second example, P=6.

Regarding the first example (P=4), Table IV shows the ideal value of the phase change "$\Phi/2\pi$ ideal" according to Equation (1), as well as the corresponding transmission efficiency $eff_1$ for the first order according to Equation (8). Table IV also shows, for a step height $qh_{ref}(\lambda=\lambda_1,p=p_1)$, two values of the phase changes "$\Phi(\lambda=\lambda_2,p=p_2)/2\pi$" and "$\Phi(\lambda=\lambda_3,p=p_3)/2\pi$" which approximate "$\Phi/2\pi$ ideal" according to Table III, as well as the corresponding transmission efficiencies $eff_1$ for the first order (m=1) according to Equation (7), in the case where $p_1=p_o$, $p_2=p_o$ and $p_3=p_e$.

TABLE IV

| | $\Phi/2\pi$ ideal | q | $\Phi(\lambda = \lambda_2, p = p_2)/$<br>$2\pi$ mod 1<br>$p_2 = p_o$ | $\Phi(\lambda = \lambda_3, p = p_3)/$<br>$2\pi$ mod 1<br>$p_3 = p_e$ |
|---|---|---|---|---|
| j = 1 | 0.125 | 5 | 0.115 | 0.095 |
| j = 2 | 0.375 | 7 | 0.361 | 0.333 |
| j = 3 | 0.625 | 1 | 0.623 | 0.619 |
| j = 4 | 0.875 | 3 | 0.869 | 0.857 |
| $eff_1$ | 81.1% | | 81.0% | 80.5% |

It is noted in Table IV that the transmission efficiency $eff_1$ has a high value (more than 75%) for the first order of both the diffracted beams 15' and 15", as initially desired. FIG. 6 shows a curve 80 representing the step height h(x) of the first example (P=4) of the first embodiment ($m_1=0$, $m_2=1$, $m_3=1$) of the diffractive part 24. It is noted in respect of the curve 80 that the pattern element is designed such that the relative step heights $h_{j+1}-h_j$ between adjacent steps of said pattern element include a relative step height having an optical path substantially equal to $a\lambda_1$, wherein a is an integer and a>1 and $\lambda_1$ is said first wavelength. In other words, such a relative step height is higher than the reference height $h_{ref}(\lambda=\lambda_1,p=p_1)$.

Regarding the second example (P=6), Table V shows the ideal value of the phase change "$\Phi/2\pi$ ideal" according to Equation (1), as well as the corresponding transmission efficiency $eff_1$ for the first order according to Equation (8). Table V also shows, for a step height $qh_{ref}(\lambda=\lambda_1,p_1=p_o)$, two values of the phase changes "$\Phi(\lambda=\lambda_2,p=p_2)/2\pi$" and "$\Phi(\lambda=\lambda_3,p=p_3)/2\pi$" which approximate "$\Phi/2\pi$ ideal" according to Table III, as well as the corresponding transmission efficiencies $eff_1$ for the first order (m=1) according to Equation (7), in the case where $p_1=p_o$, $p_2=p_o$ and $p_3=p_e$.

TABLE V

| | $\Phi/2\pi$ ideal | q | $\Phi(\lambda = \lambda_2, p = p_2)/$<br>$2\pi$ mod 1<br>$p_2 = p_o$ | $\Phi(\lambda = \lambda_3, p = p_3)/$<br>$2\pi$ mod 1<br>$p_3 = p_e$ |
|---|---|---|---|---|
| J = 1 | 0.0833 | 5 | 0.115 | 0.095 |
| J = 2 | 0.2500 | 2 | 0.246 | 0.238 |
| J = 3 | 0.4167 | 4 | 0.492 | 0.476 |
| J = 4 | 0.5833 | 1 | 0.623 | 0.619 |
| J = 5 | 0.7500 | 6 | 0.738 | 0.714 |
| J = 6 | 0.9166 | 8 | 0.984 | 0.952 |
| $eff_1$ | 91.2% | | 87.4% | 87.6% |

It is noted in Table V that the transmission efficiency $eff_1$ has a high value (more than 75%) for the first order of both the diffracted beams 15' and 15", as initially desired. FIG. 7 shows a curve 81 representing the step height h(x) of the first example (P=4) of the first embodiment ($m_1=0$, $m_2=1$, $m_3=1$) of the diffractive part 24.

In a particular case of the first embodiment of the stepped profile, the value $\Phi(\lambda=\lambda_2,p=p_2)$ is substantially equal to the value $\Phi(\lambda=\lambda_3,p=p_3)$, where the polarization $p_3$ different from the polarization $p_2$, i.e.:

$$\Phi(\lambda=\lambda_2,p=p_2)=\Phi(\lambda=\lambda_3,p=p_3) \quad (9)$$

In the present description, the values $\Phi(\lambda=\lambda_2,p=p_2)$ and $\Phi(\lambda=\lambda_3,p=p_3)$ are substantially equal where $|\Phi(\lambda=\lambda_3, p=p_3)-\Phi(\lambda=\lambda_2, p=p_2)|$ is less than or equal to preferably $0.04\pi$, where the value $0.04\pi$ is a matter of a purely arbitrary choice.

In the case where $p_1=p_o$, $p_2=p_o$ and $p_3=p_e$ it derives from Equations (0), (5b), (5c) and (9) that:

$$\frac{\lambda_2}{n_o - 1} = \frac{\lambda_3}{n_e - 1} \qquad (10)$$

It follows from Equation (10) that:

$$n_o = 1 + \frac{\lambda_2}{\lambda_3}(n_e - 1) \qquad (11)$$

Thus, for example, in the case where $n_e=1.604$, $\lambda_2=650$ nm and $\lambda_3=785$ nm, it derives from Equation (11) that $n_o=1.5$. Consequently, the birefringent material may be chosen where its refractive indices $n_e$ and $n_o$ substantially equal 1.604 and 1.5, respectively.

In the present description, two refractive indices $n_a$ and $n_b$ are substantially equal where $|n_a-n_b|$ is equal to or less than, preferably, 0.01 and, more preferably, 0.005, where the values 0.01 and 0.005 are a matter of purely arbitrary choice.

Similarly to Table I, Table VI shows the ideal values $\Phi(\lambda=\lambda_2,p=p_2)$ and $\Phi(\lambda=\lambda_3,p=p_3)$ where the radiation beams 15' and 15" traverse the step height $h_j$ which equals $h_{ref}(\lambda_{ref}=\lambda_1,p=p_1)$ in the case where $p_1=p_o$, $p_2=p_o$ and $p_3=p_e$. The values $\Phi(\lambda=\lambda_2,p=p_2)$ and $\Phi(\lambda=\lambda_3,p=p_3)$ have been calculated from Equations (4a), (4b) and (5a) to (5d) with, e.g., $n_o=1.5$, $n_e=1.604$, $\lambda_1=405$ nm, $\lambda_2=650$ nm and $\lambda_3=785$ nm.

TABLE VI

|  | $\Phi(\lambda = \lambda_2, p = p_2)/$ $2\pi$ (modulo 1) $p_2 = p_o$ | $\Phi(\lambda = \lambda_3, p = p_3)/$ $2\pi$ (modulo 1) $p_3 = p_e$ |
|---|---|---|
| $h_j = h_{ref}(\lambda_{ref} = \lambda_1, p = p_1)$ $p_1 = p_o$ | 0.623 | 0.623 |

Similarly to Table II, Table VII shows the limited numbers $\#\Phi(\lambda=\lambda_2,p=p_2)$ and $\#\Phi(\lambda=\lambda_3,p=p_3)$ in respect of a step height $h_j$ equal to $h_{ref}(\lambda=\lambda_1,p=p_1)$ in that case where $p_1=p_o$, $p_2=p_o$ and $p_3=p_e$. These limited numbers have been calculated on the theory of Continued Fractions as described above.

TABLE VII

|  | $\#\Phi(\lambda = \lambda_2, p = p_2)$ $p_2 = p_o$ | $\#\Phi(\lambda = \lambda_3, p = p_3)$ $p_3 = p_e$ |
|---|---|---|
| $h_j = h_{ref}(\lambda = \lambda_1, p = p_1)$ $p_1 = p_o$ | 8 | 8 |

Similarly to Table III, Table VIII shows the values of phase change $\Phi(\lambda=\lambda_2,p=p_2)$ and $\Phi(\lambda=\lambda_3,p=p_3)$ introduced by step heights that equal $qh_{ref}(\lambda=\lambda_1,p=p_1)$ where "q" is an integer, in the case where $p_1=p_o$, $p_2=p_o$ and $p_3=p_e$. These values are found from Table VI where the values $\Phi(\lambda=\lambda_2,p=p_2)$ and $\Phi(\lambda=\lambda_3,p=p_3)$ where the a step height that equals $h_{ref}(\lambda=\lambda_1,p=p_1)$, i.e. for q=1.

TABLE VIII

| q | $\Phi(\lambda = \lambda_2, p = p_2)/$ $2\pi$ (modulo 1) $p_2 = p_o$ | $\Phi(\lambda = \lambda_3, p = p_3)/$ $2\pi$ (modulo 1) $p_3 = p_e$ |
|---|---|---|
| 1 | 0.623 | 0.623 |
| 2 | 0.246 | 0.246 |
| 3 | 0.869 | 0.869 |
| 4 | 0.492 | 0.492 |
| 5 | 0.115 | 0.115 |
| 6 | 0.738 | 0.738 |
| 7 | 0.361 | 0.361 |
| 8 | 0.984 | 0.984 |

It is noted from Tables VI, VII and VIII that in case of the first embodiment where $p_1=p_o$, $p_2=p_o$ and $p_3=p_e$ the limited numbers $\#\Phi(\lambda=\lambda_2,p=p_2)$ and $\#\Phi(\lambda=\lambda_3,p=p_3)$ equal 8, i.e. eight different values can be chosen for each of $\Phi(\lambda=\lambda_2, p=p_2)$ and $\Phi(\lambda=\lambda_3,p=p_3)$.

By way of illustration only, a third example of the first embodiment of the stepped profile is now described in the case where P=4.

Similarly to Table IV, Table 1×shows the ideal value of the phase change "$\Phi/2\pi$ ideal" according to Equation (2), as well as the corresponding transmission efficiency $\text{eff}_1$ for the first order according to Equation (8). Table IX also shows, for a step height $qh_{ref}(\lambda=\lambda_3,p=p_1)$, two values of the phase changes "$\Phi(\lambda=\lambda_2,p=p_2)/2\pi$" and "$\Phi(\lambda=\lambda_3,p=p_3)/2\pi$" which approximate "$\Phi/2\pi$ ideal" according to Table VIII, as well as the corresponding transmission efficiencies $\text{eff}_1$ for the first order (m=1) according to Equation (7), in the case where $p_1=p_o, p_2=p_o$ and $p_3=p_e$.

TABLE IX

| | $\Phi/2\pi$ ideal | q | $\Phi(\lambda = \lambda_2, p = p_2)/$ $2\pi$ (modulo 1) $p_2 = p_o$ | $\Phi(\lambda = \lambda_3, p = p_3)/$ $2\pi$ (modulo 1) $p_3 = p_e$ |
|---|---|---|---|---|
| j = 1 | 0.125 | 5 | 0.115 | 0.115 |
| j = 2 | 0.375 | 7 | 0.361 | 0.361 |
| j = 3 | 0.625 | 1 | 0.623 | 0.623 |
| j = 4 | 0.875 | 3 | 0.869 | 0.869 |
| $\text{eff}_1$ | 81.1% | | 81.0% | 81.0% |

It is noted in Table IX that the transmission efficiency $\text{eff}_1$ has a high value (more than 75%) for the first order of both the diffracted beams 15' and 15", as initially desired. FIG. 8 shows a curve 82 representing the step height h(x) of the third example (P=4) of the first embodiment ($m_1=0$, $m_2=1$, $m_3=1$) of the diffractive part 24.

The second embodiment of the stepped profile is designed such that $m_1=0$, $m_2=1$ and $m_3=0$. Accordingly, both values $\Phi(\lambda=\lambda_1,p=p_1)$ and $\Phi(\lambda=\lambda_3,p=p_3)$ substantially equal zero modulo $2\pi$ and the value $\Phi(\lambda=\lambda_2,p=p_2)$ is chosen among at least three different phase changes. It is noted that the values $\Phi(\lambda=\lambda_1,p=p_1)$ and $\Phi(\lambda=\lambda_3,p=p_3)$ (which both substantially equal zero modulo $2\pi$) may however differ from each other.

In a particular case of the second embodiment of the stepped profile, the value $\Phi(\lambda=\lambda_1,p=p_1)$ is substantially equal to the value $\Phi(\lambda=\lambda_3,p=p_3)$, where the polarization $p_1$ differs from the polarization $p_3$, i.e.:

$$\Phi(\lambda=\lambda_1,p=p_1)=\Phi(\lambda=\lambda_3,p=p_3) \qquad (12)$$

In the case where $p_1=p_o$, $p_2=p_o$ and $p_3=p_e$ it derives from Equations (0), (4b), (5c) and (12) that:

$$\frac{\lambda_1}{n_o - 1} = \frac{\lambda_3}{n_e - 1} \quad (13)$$

It follows from Equation (13) that:

$$n_o = 1 + \frac{\lambda_1}{\lambda_3}(n_e - 1) \quad (14)$$

Thus, for example, in the case where $n_e=1.722$, $\lambda_1=405$ nm and $\lambda_3=650$ nm, it derives from Equation (14) that $n_o=1.45$. Consequently, the birefringent material may be chosen where its refractive indices $n_e$ and $n_o$ substantially equal 1.722 and 1.45, respectively.

Similarly to Table I, Table X shows the ideal values $\Phi(\lambda=\lambda_2,p=p_2)$ and $\Phi(\lambda=\lambda_3,p=p_3)$ where the radiation beams 15' and 15" traverse the step height $h_j$ which equals $h_{ref}$ ($\lambda_{ref}=\lambda_1,p=p_1$) in the case where $p_1=p_o$, $p_2=p_e$ and $p_3=p_e$. The values $\Phi(\lambda=\lambda_2,p=p_2)$ and $\Phi(\lambda=\lambda_3,p=p_3)$ have been calculated from Equations (4a), (4b) and (5a) to (5d) with, e.g., $n_o=1.45$, $n_e=1.722$, $\lambda_1=405$ nm, $\lambda_2=785$ nm and $\lambda_3=650$ nm.

TABLE X

| | $\Phi(\lambda = \lambda_2, p = p_2)/$ $2\pi$ (modulo 1) $p_2 = p_e$ | $\Phi(\lambda = \lambda_3, p = p_3)/$ $2\pi$ (modulo 1) $p_3 = p_e$ |
|---|---|---|
| $h_j = h_{ref}(\lambda_{ref} = \lambda_1, p = p_1)$ $p_1 = p_o$ | 0.828 | 0 |

Similarly to Table II, Table XI shows the limited numbers $\#\Phi(\lambda=\lambda_2,p=p_2)$ and $\#\Phi(\lambda=\lambda_3,p=p_3)$ in respect of a step height $h_j$ equal to $h_{ref}(\lambda=\lambda_1,p=p_1)$ in that case where $p_1=p_o$, $p_2=p_e$ and $p_3=p_e$. These limited numbers have been calculated on the theory of Continued Fractions as described above.

TABLE XI

| | $\#\Phi(\lambda = \lambda_2, p = p_2)$ $p_2 = p_e$ | $\#\Phi(\lambda = \lambda_3, p = p_3)$ $p_2 = p_e$ |
|---|---|---|
| $h_j = h_{ref}(\lambda = \lambda_1, p = p_1)$ $p_1 = p_o$ | 6 | 1 |

Similarly to Table III, Table XII shows the values of phase change $\Phi(\lambda=\lambda_2,p=p_2)$ and $\Phi(\lambda=\lambda_3,p=p_3)$ introduced by step heights that equal $qh_{ref}(\lambda=\lambda_1,p=p_o)$ where "q" is an integer. These values are found from Table X where the values $\Phi(\lambda=\lambda_2,p=p_2)$ and $\Phi(\lambda=\lambda_3,p=p_3)$ are known a step height that equals $h_{ref}(\lambda=\lambda_1,p=p_1)$, i.e. for q=1.

TABLE XII

| q | $\Phi(\lambda = \lambda_2, p = p_2)/$ $2\pi$ (modulo 1) $p_2 = p_e$ | $\Phi(\lambda = \lambda_3, p = p_3)/$ $2\pi$ (modulo 1) $p_3 = p_e$ |
|---|---|---|
| 1 | 0.828 | 0.0 |
| 2 | 0.656 | 0.0 |
| 3 | 0.484 | 0.0 |
| 4 | 0.312 | 0.0 |
| 5 | 0.140 | 0.0 |
| 6 | 0.968 | 0.0 |
| 7 | 0.796 | 0.0 |

It is noted from Tables X, XI and XII that in case of the second embodiment where $p_1=p_o$, $p_2=p_e$ and $p_3=p_e$ the limited number $\#\Phi(\lambda=\lambda_2,p=p_2)$ equal 6, i.e. six different values can be chosen for $\Phi(\lambda=\lambda_2,p=p_2)$.

By way of illustration only, an example of the second embodiment of the stepped profile is now described where P=4.

Similarly to Table IV, Table XIII shows the ideal value of the phase change "$\Phi/2\pi$ ideal" according to Equation (1), as well as the corresponding transmission efficiency $\text{eff}_1$ for the first order according to Equation (8). Table XII also shows, for a step height $qh_{ref}(\lambda=\lambda_1,p=p_1)$, two values of the phase changes "$\Phi(\lambda=\lambda_2,p=p_2)/2\pi$" and "$\Phi(\lambda=\lambda_2,p=p_2)/2\pi$" which approximate "$\Phi/2\pi$ ideal" according to Table XII, as well as the corresponding transmission efficiencies $\text{eff}_1$ for the first order (m=1) according to Equation (7), in the case where $p_1=p_o$, $p_2=p_e$ and $p_3=p_e$.

TABLE XIII

| | $\Phi/2\pi$ ideal | q | $\Phi(\lambda = \lambda_2, p = p_2)/2\pi$ (modulo 1) |
|---|---|---|---|
| j = 1 | 0.125 | 5 | 0.140 |
| j = 2 | 0.375 | 4 | 0.312 |
| j = 3 | 0.625 | 2 | 0.656 |
| j = 4 | 0.875 | 1 | 0.828 |
| $\text{eff}_1$ | 81.1% | | 76.1% |

It is noted in Table XIII that the transmission efficiency $\text{eff}_1$ has a high value (more than 75%) for the first order of the diffracted beams 15', as initially desired. FIG. 9 shows a curve 83 representing the step height h(x) of the third example (P=4) of the second embodiment ($m_1=0$, $m_2=1$, $m_3=0$) of the diffractive part 24.

The third embodiment of the stepped profile is designed such that $m_1=0$, $m_2=1$ and $m_3=0$. Accordingly, the value $\Phi(\lambda=\lambda_1,p=p_1)$ substantially equals zero modulo $2\pi$, the value $\Phi(\lambda=\lambda_2,p=p_2)$ is chosen among at least three different phase changes, and the value $\Phi(\lambda=\lambda_3,p=p_3)$ substantially equals $\pi$ modulo $2\pi$.

Similarly to Table I, Table XIV shows the ideal values $\Phi(\lambda=\lambda_2,p=p_2)$ and $\Phi(\lambda=\lambda_3,p=p_3)$ where the radiation beams 15' and 15" traverse the step height $h_j$ which equals $h_{ref}$ ($\lambda_{ref}=\lambda_1,p=p_1$) in the case where $p_1=p_e$, $p_2=p_o$ and $p_3=p_o$. The values $\Phi(\lambda=\lambda_2,p=p_2)$ and $\Phi(\lambda=\lambda_3,p=p_3)$ have been calculated from Equations (4a), (4b) and (5a) to (5d) with, e.g., $n_o=1.50$, $n_e=1.60$, $\lambda_1=405$ nm, $\lambda_2=785$ nm and $\lambda_3=650$ nm.

TABLE XIV

| | $\Phi(\lambda = \lambda_2, p = p_2)/$ $2\pi$ (modulo 1) $p_2 = p_o$ | $\Phi(\lambda = \lambda_3, p = p_3)/$ $2\pi$ (modulo 1) $p_3 = p_o$ |
|---|---|---|
| $h_j = h_{ref}(\lambda_{ref} = \lambda_1, p = p_1)$ $p_1 = p_e$ | 0.430 | 0.519 |

Similarly to Table II, Table XV shows the limited numbers $\#\Phi(\lambda=\lambda_2,p=p_2)$ and $\#\Phi(\lambda=\lambda_3,p=p_3)$ in respect of a step height $h_j$ equal to $h_{ref}(\lambda=\lambda_1,p=p_1)$ in that case where $p_1=p_e$, $p_2=p_o$ and $p_3=p_o$. These limited numbers have been calculated on the theory of Continued Fractions as described above.

TABLE XV

|  | #Φ(λ = λ₂, p = p₂) $p_2 = p_o$ | #Φ(λ = λ₃, p = p₃) $p_3 = p_o$ |
|---|---|---|
| $h_j = h_{ref}(\lambda = \lambda_1, p = p_1)$ $p_1 = p_e$ | 7 | 2 |

Similarly to Table III, Table XVI shows the values of phase change $\Phi(\lambda=\lambda_2,p=p_2)$ and $\Phi(\lambda=\lambda_3,p=p_3)$ introduced by step heights that equal $qh_{ref}(\lambda=\lambda_1,p=p_1)$ where $p_1=p_e$ and "q" is an integer. These values are found from Table XIV where the values $\Phi(\lambda=\lambda_2,p=p_2)$ and $\Phi(\lambda=\lambda_3,p=p_3)$ are known a step height that equals $h_{ref}(\lambda=\lambda_1,p=p_1)$, i.e. for q=1.

TABLE XVI

| m | Φ(λ = λ₂, p = p₂)/2π (modulo 1) $p_2 = p_o$ | Φ(λ = λ₃, p = p₃)/2π (modulo 1) $p_3 = p_o$ |
|---|---|---|
| 1 | 0.430 | 0.519 |
| 2 | 0.860 | 0.038 |
| 3 | 0.290 | 0.557 |
| 4 | 0.720 | 0.076 |
| 5 | 0.150 | 0.595 |
| 6 | 0.580 | 0.114 |
| 7 | 0.010 | 0.633 |
| 8 | 0.440 | 0.152 |
| 9 | 0.870 | 0.671 |
| 10 | 0.300 | 0.190 |
| 11 | 0.730 | 0.709 |
| 12 | 0.160 | 0.228 |

It is noted from Tables XIV, XV and XVI that in case of the third embodiment where $p_1=p_e$, $p_2=p_o$ and $p_3=p_o$ the limited number #Φ(λ=λ₃,p=p₃) equal 2, i.e. two different values can be chosen for Φ(λ=λ₃,p=p₃), and the limited number #Φ(λ=λ₂,p=p₂) equal 7, i.e. seven different values can be chosen for Φ(λ=λ₂,p=p₂).

By way of illustration only, an example of the third embodiment of the stepped profile is now described where P=4.

Similarly to Table IV, Table XVII shows for a step height $qh_{ref}(\lambda=\lambda_1,p=p_1)$, two values of the phase changes "Φ(λ=λ₂, p=p₂)/2π" and "Φ(λ=λ₃,p=p₃)/2π" which approximate "Φ/2π ideal" according to Table XVI, as well as the corresponding transmission efficiencies $eff_1$ for the first order (m=1) according to Equation (7), in the case where $p_1=p_e$, $p_2=p_o$ and $p_3=p_o$.

TABLE XVII

|  | m | Φ(λ = λ₂, p = p₂)/2π (modulo 1) $p_2 = p_o$ | Φ(λ = λ₃, p = p₃)/2π (modulo 1) $p_3 = p_o$ |
|---|---|---|---|
| j = 1 | 5 | 0.150 | 0.595 |
| j = 2 | 1 | 0.430 | 0.519 |
| j = 3 | 11 | 0.730 | 0.709 |
| j = 4 | 9 | 0.870 | 0.671 |
| $eff_0$ |  | 1.8% | 80.6% |
| $eff_1$ |  | 75.9% | 4.5% |

It is noted in Table XVII that the four phase steps introduce phase changes for the wavelength $\lambda_3$ having substantially the same value.

It is also noted in Table XVII that the transmission efficiency $eff_1$ has a low value (less than 5%) for the first order of the diffracted beams 15" and a high value (more than 75%) for the first order of the diffracted beams 15', as initially desired. FIG. 10 shows a curve 84 representing the step height h(x) of that example (P=4) of the third embodiment ($m_1=0$, $m_2=1$, $m_3=0$) of the diffractive part 24.

Once the stepped profile of each pattern element has been designed as described above in respect of any of the first, second and third embodiments, the pattern of the pattern elements of the diffractive part 24 is designed so that the combination of the objective lens system 8 and the diffractive part 24 has a first focusing characteristic for the radiation beam 4, a second focusing characteristic for the radiation beam 4', and a third focusing characteristic for the radiation beam 4".

In this embodiment, the pattern is designed so that the combination of the objective lens 17 and the diffractive part 24 corrects spherical aberration caused by the difference between the information layer depths 27 and 27' (due to the difference in thickness of the transparent layers 5 and 5') and between the information layer depths 27 and 27" (due to the difference in thickness of the transparent layers 5 and 5").

More specifically, the pattern of the diffractive part 24 is designed as a circular grating structure having a pattern of coaxially ring-shaped pattern elements with gradually increasing width towards the center of the objective lens 17 (as shown in FIG. 3). As a result, the combination of the diffractive part 24 and the objective lens 17 focuses the radiation beam 15 in the information layer 2 having the first information layer depth 27 and no spherical aberration is generated when the radiation beam 15 emerges from the objective lens 17 (the first focusing characteristic).

Furthermore, the pattern of the diffractive part 24 is designed to generate, in combination with the objective lens 17, an amount of spherical aberration which is proportional to $m_1\lambda_1-m_2\lambda_2$ (i.e. in this embodiment $-\lambda_2$ since $m_1=0$ and $m_2=1$). As a result, the combination of the diffractive part 24 and the objective lens 17 focuses the radiation beam 15' in the information layer 2' having the information layer depth 27' and spherical aberration generated due the difference in thickness of the transparent layer is compensated (the second focusing characteristic).

Similarly, the pattern of the diffractive part 24 is designed to generate, in combination with the objective lens 17, another amount of spherical aberration which is proportional to $m_1\lambda_1-m_3\lambda_3$ (i.e. in this embodiment $-\lambda_3$ since $m_1=0$ and $m_3=1$). As a result, the combination of the diffractive part 24 and the objective lens 17 focuses the radiation beam 15" in the information layer 2" having the information layer depth 27' and spherical aberration generated due the difference in thickness of the transparent layer is compensated (the third focusing characteristic). It is noted in this embodiment that both the second and third focussing characteristics differ from the first focussing characteristic, as shown in FIG. 2.

Whilst in the above described embodiment an optical scanning device compatible with a CD-format disc, a "Red-DVD"-format disc and a "Blue-DVD"-format disc is described, it is to be appreciated that the scanning device according to the invention can be alternatively used for any other types of optical record carriers to be scanned.

An alternative of the stepped profiles described above may be designed for forming diffracted radiation beams for diffraction order other than the zeroth order and the first order, or a combination of orders with a main selected order and at least another selected order.

In other alternatives of the stepped profiles described above, the wavelength $\lambda_2$ or $\lambda_3$ is chosen as the design wavelength. Table XVIII shows the values of the reference height $h_{ref}(\lambda, p)$ in the case where the wavelength $\lambda$ equals $\lambda_2$ or $\lambda_3$ and the polarization p equals $p_o$ or $p_e$ and where, e.g., $n_o=1.5$, $n_e=1.6$, $\lambda_{2=650}$ nm and $\lambda_3=785$ nm.

TABLE XVIII

| | $h_{ref}(\lambda, p)$ | |
|---|---|---|
| | $\lambda = \lambda_2$ | $\lambda = \lambda_3$ |
| $p = p_e$ | 1.083 µm | 1.308 µm |
| $p = p_o$ | 1.300 µm | 1.570 µm |

As an alternative to the pattern of the pattern elements described above for correcting spherical aberration, the pattern is designed, e.g., for correcting spherochromatism and chromatic aberration or for carrying out the three-spot push pull method by forming the main spot from the first diffracted beam with a transmission efficiency equal to, e.g., 80% and the two satellite spots from the second and third diffracted beams with a transmission efficiency equal to, e.g., 10% for each beam.

An alternative to the diffractive part arranged on the entrance face of the objective lens may be a grating of any shape like a plane grating, since the stepped-profile of each pattern element is determinative for the transmission efficiency in respect of each order, irrespective of the shape of the grating.

As an alternative to the optical scanning device described with wavelengths of 785 nm, 660 nm and 405 nm are used, it is to be appreciated that radiation beams of any other combinations of wavelengths suitable for scanning optical record carriers may be used.

As another alternative to the optical scanning device described with the above values of numerical apertures in respect of the first, second and third diffracted beams, it is to be appreciated that radiation beams of any other combinations of numerical apertures suitable for scanning optical record carriers may be used.

The invention claimed is:

1. An optical scanning device for scanning a first information layer by means of a first radiation beam having a first wavelength and a first polarization, a second information layer by means of a second radiation beam having a second wavelength and a second polarization, and a third information layer by means of a third radiation beam having a third wavelength and a third polarization, wherein said first, second and third wavelengths substantially differ from each other and at least one of said first, second and third polarizations differs from the others, the device comprising:

a radiation source for supplying said first, second and third radiation beams consecutively or simultaneously, an objective lens system for converging said first, second and third radiation beams on the positions of said first, second and third information layers, respectively, and a diffractive part arranged in the optical path of said first, second and third radiation beams, the part including a pattern of pattern elements which have substantially one stepped profile for forming a first diffracted radiation beam, a second diffracted radiation beam and a third diffracted radiation beam from said first, second and third radiation beams, respectively, the part comprising birefringent material sensitive to said first, second and third polarizations, characterized in that said stepped profile is designed such that the heights of the steps of a pattern element introduce phase changes that substantially equal at least two different multiples of $2\pi$ for said first wavelength and at least two substantially different phase changes modulo $2\pi$ for said second wavelength.

2. An optical scanning device according to claim 1, wherein said stepped profile is further designed such that the heights of the steps of a pattern element introduce phase changes that substantially equal at least two substantially different phase changes modulo $2\pi$ for said third wavelength.

3. An optical scanning device according to claim 2, wherein said stepped profile is further designed such that the heights of the steps of a pattern element introduce substantially identical phase changes for both said second and third wavelengths, wherein said third polarization differs from said second polarization.

4. An optical scanning device according to claim 3, wherein the extraordinary refractive index of said birefringent material substantially equals $$1 + \frac{\lambda_c}{\lambda_b}(n_o - 1),$$

where "$n_o$" is the ordinary refractive index of said birefringent material and "$\lambda_b$" and "$\lambda_c$" are either said second and third wavelengths, respectively, or said third and second wavelengths, respectively.

5. An optical scanning device according to claim 1, wherein said stepped profile is designed such that the heights of the steps of a pattern element introduce phase changes that substantially equal at least two different multiples of $2\pi$ for said third wavelength.

6. An optical scanning device according to claim 5, wherein said stepped profile is further designed such that the heights of the steps of a pattern element introduce substantially identical phase changes for both said first and third wavelengths, wherein said third polarization differs from said first polarization.

7. An optical scanning device according to claim 6, wherein the extraordinary refractive index of said birefringent material substantially equals $$1 + \frac{\lambda_c}{\lambda_b}(n_o - 1),$$

where "$n_o$" is the ordinary refractive index of said birefringent material and "$\lambda_b$" and "$\lambda_c$" are either said first and third wavelengths, respectively, or said third and first wavelengths, respectively.

8. An optical scanning device according to claim 1, wherein said stepped profile is designed such that the heights of the steps of a pattern element introduce phase changes that substantially equal at least two different odd multiples of $\pi$ for said third wavelength.

9. An optical scanning device according to claim 8, wherein said stepped profile is designed such that the heights of the steps of a pattern element introduce phase changes that substantially equal at least two of an odd number of substantially different phase changes for said second wavelength.

10. An optical scanning device according to claim 1, wherein said pattern element is designed such that the relative step heights between adjacent steps of said pattern element include a relative step height having an optical path substantially equal to $a\lambda_1$, wherein a is an integer and a>1 and $\lambda_1$ is said first wavelength.

11. An optical scanning device according to claim 1, wherein the shape of said diffractive part is generally circular and the steps of said pattern element are generally annular.

12. An optical scanning device according to claim 1, wherein said diffractive part is formed on a face of a lens of the objective lens system.

13. An optical scanning device to claim 1, wherein said diffractive part is formed on an optical plate provided between said radiation source and said objective lens system.

14. An optical scanning device according to claim 13, wherein said optical plate comprises a quarter wavelength plate or a beam splitter.

15. A diffractive part for use in an optical device for scanning a first information layer by means of a first radiation beam having a first wavelength and a first polarization, a second information layer by means of a second radiation beam having a second wavelength and a second polarization, and a third information layer by means of a third radiation beam having a third wavelength and a third polarization, wherein said first, second and third wavelengths substantially differ from each other and at least one of said first, second and third polarizations differs from the others, the diffractive part:
being arranged in the optical path of said first, second and third radiation beams,
including a pattern of pattern elements which have substantially one stepped profile for forming a first diffracted radiation beam, a second diffracted radiation beam and a third diffracted radiation beam from said first, second and third radiation beams, respectively, and
comprising birefringent material sensitive to said first, second and third polarizations,
characterized in that said stepped profile is designed such that the heights of the steps of a pattern element introduce phase changes that substantially equal at least two different multiples of $2\pi$ for said first wavelength, at least two substantially different phase changes modulo $2\pi$ for said second wavelength and, for said third wavelength, one of the following: at least two substantially different phase changes modulo $2\pi$, at least two different multiples of $2\pi$, or at least two different odd multiples of $\pi$.

16. A lens for use in an optical device for scanning a first information layer by means of a first radiation beam having a first wavelength and a first polarization, a second information layer by means of a second radiation beam having a second wavelength and a second polarization, and a third information layer by means of a third radiation beam having a third wavelength and a third polarization, wherein said first, second and third wavelengths substantially differ from each other and at least one of said first, second and third polarizations differs from the others, the lens being provided with a diffractive part according to claim 15.

17. An optical scanning device, comprising:
a radiation source for supplying first, second and third radiation beams at least consecutively, the first, second and third radiation beams having respective first, second and third wavelengths that are substantially mutually different;
an objective lens system for converging said first, second and third radiation beams on the positions of said first, second and third information layers, respectively, and
a diffractive part arranged in the optical path of said first, second and third radiation beams, the part including a pattern of pattern elements which have substantially one stepped profile for forming a first diffracted radiation beam, a second diffracted radiation beam and a third diffracted radiation beam from said first, second and third radiation beams, respectively, the stepped profile being adapted such that the heights of the steps of a pattern element introduce phase changes that substantially equal at least two different multiples of $2\pi$, for said first wavelength and at least two substantially different phase changes modulo $2\pi$, for said second wavelength, the part including birefringent material sensitive to respective polarizations of said first, second and third beams.

18. A diffractive part, comprising:
a pattern of pattern elements which have substantially one stepped profile for forming a first diffracted radiation beam, a second diffracted radiation beam, and a third diffracted radiation beam from first, second and third radiation beams, respectively, when positioned in the paths of the respective first, second and third radiation beams having respective first, second and third wavelengths that are substantially mutually different, the stepped profile being adapted such that the heights of the steps of a pattern element introduce phase changes that substantially equal at least two different multiples of $2\pi$, for said first wavelength, at least two substantially different phase changes modulo $2\pi$, for said second wavelength and, for said third wavelength, one of the following: at least two substantially different phase changes modulo $2\pi$, at least two different multiples of $2\pi$, or at least two different odd multiples of $\pi$, and
birefringent material sensitive to respective polarizations of said first, second and third beams.

19. A lens, comprising:
a pattern of pattern elements which have substantially one stepped profile for forming a first diffracted radiation beam, a second diffracted radiation beam, and a third diffracted radiation beam from first, second and third radiation beams, respectively, when positioned in the paths of the respective first, second and third radiation beams having respective first, second and third wavelengths that are substantially mutually different, the stepped profile being adapted such that the heights of the steps of a pattern element introduce phase changes that substantially equal at least two different multiples of $2\pi$, for said first wavelength, at least two substantially different phase changes modulo $2\pi$, for said second wavelength and, for said third wavelength, one of the following: at least two substantially different phase changes modulo $2\pi$, at least two different multiples of $2\pi$, or at least two different odd multiples of $\pi$, and
birefringent material sensitive to respective polarizations of said first, second and third beams, and
wherein the lens focuses the first, second and third radiation beams at respective first focus distance, second focus distance, and third focus distance, the first, second and third focus distances being mutually substantially different by at least the distance between information layers of an optical record carrier.

* * * * *